US012244112B2

(12) United States Patent
Kamor et al.

(10) Patent No.: US 12,244,112 B2
(45) Date of Patent: Mar. 4, 2025

(54) WIRE TERMINALS AND METHOD OF USES

(71) Applicant: LEVITON MANUFACTURING CO., INC., Melville, NY (US)

(72) Inventors: Michael Kamor, North Massapequa, NY (US); Kelly Tyler, Levittown, NY (US); Stanley Mayer, Rego Park, NY (US); William Grande, Valley Cottage, NY (US); William Randall, Port Washington, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 18/377,947

(22) Filed: Oct. 9, 2023

(65) Prior Publication Data

US 2024/0039178 A1 Feb. 1, 2024

Related U.S. Application Data

(63) Continuation of application No. 17/700,883, filed on Mar. 22, 2022, now Pat. No. 11,791,573.

(60) Provisional application No. 63/175,381, filed on Apr. 15, 2021.

(51) Int. Cl.
*H01R 4/48* (2006.01)
*H01R 4/26* (2006.01)

(52) U.S. Cl.
CPC ............... *H01R 4/489* (2013.01); *H01R 4/26* (2013.01); *H01R 4/483* (2023.08); *H01R 4/4821* (2023.08); *H01R 4/485* (2023.08)

(58) Field of Classification Search
None
See application file for complete search history.

(56) References Cited

U.S. PATENT DOCUMENTS

| | | | | |
|---|---|---|---|---|
| 4,759,726 | A | 7/1988 | Naylor et al. | |
| 6,250,950 | B1 * | 6/2001 | Pallai ................. | H01R 4/48365 439/441 |
| 6,749,449 | B2 | 6/2004 | Mortun | |
| 7,114,986 | B1 | 10/2006 | Toly | |
| 7,909,664 | B2 | 3/2011 | Ilkhanov | |
| 7,963,812 | B2 | 6/2011 | Ilkhanov | |
| 8,047,883 | B2 | 11/2011 | Montalbano et al. | |
| 8,137,145 | B2 | 3/2012 | Joy | |

(Continued)

FOREIGN PATENT DOCUMENTS

| | | | |
|---|---|---|---|
| CN | 111697357 | A | 9/2020 |
| DE | 102020104140 | A1 | 8/2021 |

(Continued)

OTHER PUBLICATIONS

International Search Report and Written Opinion for the International Patent Application No. PCT/US2023/011397, mailed May 4, 2023, 18 pages.

(Continued)

*Primary Examiner* — Ross N Gushi
(74) *Attorney, Agent, or Firm* — KDW FIRM PLLC

(57) ABSTRACT

The present disclosure relates to wire terminals and/or termination mechanisms arranged and configured for use with a wiring device The wire terminals may be used in any suitable line-voltage wiring device. The wire terminals are arranged and configured to selectively receive a distal end of a wire therein.

31 Claims, 24 Drawing Sheets

(56) References Cited

U.S. PATENT DOCUMENTS

| | | | |
|---|---|---|---|
| 8,475,191 B2 | 7/2013 | Schafmeister | |
| 9,124,034 B2 | 9/2015 | Kollmann et al. | |
| 9,413,082 B2 | 8/2016 | Gassauer | |
| 9,466,895 B2 | 10/2016 | Kollmann et al. | |
| 9,502,790 B2 | 11/2016 | Kollmann et al. | |
| 10,230,179 B2 | 3/2019 | Wilinski | |
| 10,418,727 B1 * | 9/2019 | Wu | H01R 4/48275 |
| 10,461,444 B2 | 10/2019 | Scanzillo et al. | |
| 11,495,895 B2 | 11/2022 | Scanzillo et al. | |
| 11,705,667 B2 * | 7/2023 | Moser | H01R 4/48365 439/157 |
| 2010/0003865 A1 | 1/2010 | Alderson | |
| 2015/0372402 A1 | 12/2015 | Kollmann | |
| 2016/0020543 A1 | 1/2016 | Tedeschi | |
| 2018/0331438 A1 | 11/2018 | Moser | |
| 2021/0083409 A1 | 3/2021 | Hartmann | |
| 2023/0024505 A1 | 1/2023 | Scanzillo | |
| 2023/0036314 A1 | 2/2023 | Scanzillo | |
| 2023/0327377 A1 | 10/2023 | Scanzillo | |

FOREIGN PATENT DOCUMENTS

| | | |
|---|---|---|
| DE | 102020118578 A1 | 1/2022 |
| EP | 1956684 A2 | 8/2008 |
| EP | 2096714 A1 | 9/2009 |
| EP | 2355249 A1 | 8/2011 |
| WO | 2014191676 A1 | 12/2014 |

OTHER PUBLICATIONS

International Search Report and Written Opinion for the International Patent Application No. PCT/US2023/011392, mailed May 4, 2023, 16 pages.

International Search Report and Written Opinion for International Application No. PCT/US 24/23075, dated Aug. 30, 2024, 12 pages.

* cited by examiner

WIRE TERMINALS AND METHOD OF USES

CROSS-REFERENCE TO RELATED APPLICATIONS

This application is a continuation application of pending U.S. patent application Ser. No. 17/700,883, filed Mar. 22, 2022, which is a non-provisional of, and claims the benefit of the filing date of, U.S. provisional patent application No. 63/175,381, filed Apr. 15, 2021, 2021, entitled "Wire Terminals and Methods of Use," the entirety of which application is incorporated by reference herein.

TECHNICAL FIELD

The present disclosure is directed to wiring devices and, more particularly, to wiring devices including improved wire terminals or termination mechanisms (terms used interchangeably herein without the intent to limit) and related methods of use thereof.

BACKGROUND

To route, install and otherwise use AC electrical power, manufactures produce many different kinds of devices. These devices are referred to herein as wiring devices. Examples of wiring devices include electrical receptacles, switches, dimmers, occupancy sensors, lighting fixtures, ground/arc fault circuit interrupters, and the like. Wiring devices are connected to the AC electrical power via wires/conductors (the terms wire and conductor may be used hereinafter synonymously), which can include solid core conductors and/or stranded wire conductors. A wire includes (or is considered to be) a conductive path for carrying the AC electrical power.

Wiring devices typically include wire termination terminals for terminating wires. Wire terminal types typically found on wiring devices include sets of line and load terminals and/or ground terminals. Each set of line and/or load terminals typically comprise individual phase and neutral terminals. Together these terminals, depending on the mechanical configuration, may be wired using one or more of several different common termination mechanisms/techniques where the mechanical configuration of the termination mechanisms typically dictates the technique used.

One such termination mechanism/technique is commonly referred to as "side-wire" (or otherwise referred to as "wrap-wire"). To terminate a wire using a side-wire terminal, an end of the wire is initially stripped to expose at least a portion of the end of the wire and then this exposed portion is wrapped around a terminal screw. The terminal screw is then tightened causing the head of the screw to secure the exposed wire between the head of the screw and a metallic plate (e.g., a brass terminal).

Another type of wiring mechanism/technique is referred to as "back-wire" (otherwise also referred to as "clamp-wire"). Typically, in back-wire terminals a screw engages a metallic plate with a second metallic plate (the resulting arrangement forming in a clamp) to compress a wire therebetween. In such a back-wire termination mechanism, a first metallic plate typically has a threaded opening and forms the clamp arrangement with a second metallic plate that has a non-threaded opening sized large enough to allow this second metallic plate to slide along the shaft of the screw between the first metallic plate and the head of the screw. Placing an exposed end of a stripped wire between the two metallic plates and tightening the screw results in the wire being removably secured between the two plates.

Another type of wire terminal mechanism/technique is referred to as "push in". Push-in termination mechanisms typically comprise a small hole, or aperture, in the wiring device housing through which an exposed end of a stripped wire is inserted and removably secured within the wiring device with the cooperation of a retention mechanism. For example, an end of a solid-core wire is initially stripped to expose about five-eighths of an inch of the wire core. The resultant exposed portion of the wire is then inserted through the hole and into engagement with the internal retention mechanism which removably secures the exposed end of the wire by, e.g., applying clamping pressure to the wire in order to maintain the wire in electrical contact with an internal conductive portion of the wiring device. The retention mechanism provides sufficient resistance to prevent the wire from being pulled out of the hole. Typically, to release the wire, a tool (e.g., a screwdriver) is used to engage a releasing mechanism to release the wire.

Wiring devices usually also include a ground terminal that typically uses a wrap-wire/side-wire arrangement, as described above; e.g., a metallic plate that includes a threaded opening for receiving a ground terminal screw. Grounded wiring devices could also employ a conductive strap, or frame, that may be used in conjunction with a ground terminal screw for grounding the device. Wiring devices that use such a ground terminal screw in a side-wire/wrap-wire configuration would be wired as discussed above using an exposed portion of the ground wire.

It is desirable for wiring devices to incorporate easier wire termination mechanisms to facilitate quicker installation. However, secure wire retention when utilizing wire termination mechanisms remains a concern. Accordingly, there remains a need for improved wire termination mechanisms. It is with this in mind that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a wiring device. In one embodiment, the wiring device includes a housing and an electrical contact disposed at least partially within the housing, and a wire terminal arranged and configured to mechanically and electrically secure a line-voltage AC electrical wire to the electrical contact. In one embodiment, the wire terminal includes a lever, a first pivot pin, a cage, and a spring. The lever is arranged and configured to move between a first position and a second position, the lever including an aperture. The first pivot pin is received within the aperture formed in the lever so that the lever can be rotated between the first and second positions. The cage is arranged and configured to contact the electrical contact, the cage at least partially defining an electrical wire receiving space. The spring is positioned at least partially within the electrical wire receiving space defined by the cage. In the second position, the lever moves the spring away from the electrical contact to enlarge the electrical wire receiving space to receive the electrical wire. In the first position, the lever biases the spring into contact with the electrical wire to securely retain the electrical wire within the electrical wire receiving space and in contact with the electrical contact.

In one embodiment, the wire terminal further comprises a second pivot pin, the lever including an elongated arcuate slot, wherein the elongated arcuate slot is arranged and configured to receive the second pivot pin.

In one embodiment, the spring includes an aperture formed therein, the aperture formed in the spring being arranged and configured to receive the second pivot pin so that, in use, when the lever is moved to the second position, the spring is pulled away from the electrical contact thereby enlarging the electrical wire receiving space.

In one embodiment, the spring includes a first segment including the aperture, a second segment extending from an end of the first segment, and a third segment extending from an end of the second segment.

In one embodiment, the third segment is arranged and configured to engage the cage.

In one embodiment, the cage includes an opening arranged and configured to enable the electrical contact to pass therethrough.

In one embodiment, the cage include a first arm, a second arm, and a sidewall extending therebetween, the first and second arms each including an opening arranged and configured to enable the electrical contact to pass therethrough, the first and second arms and the sidewall partially defining the electrical wire receiving space.

In one embodiment, the lever is pivotable between the first and second positions.

In one embodiment, the lever is biased by the spring to the first position.

In one embodiment, the spring includes a stab or sharpened edge portion arranged and configured to contact the electrical wire to provide additional retention force in maintaining the electrical wire in the electrical wire receiving space.

In one embodiment, the wire terminal includes first, second, and third levers, each of the first, second, and third levers being color-coded to indicate ground, neutral, and phase connection.

In one embodiment, in the second position, the lever moves the spring away from the electrical contact to enlarge the electrical wire receiving space so that the electrical wire can be freely inserted without interference or resistance.

Disclosed herein is a wiring device. In one embodiment, the wiring device includes a housing and an electrical contact disposed at least partially within the housing and a wire terminal arranged and configured to mechanically and electrically secure a line-voltage AC electrical wire to the electrical contact. In one embodiment, the wire terminal includes a lever, a cage, and a spring. The lever is arranged and configured to move between a first position and a second position. The cage is arranged and configured to contact the electrical contact, the cage at least partially defining an electrical wire receiving space for receiving the electrical wire. The spring is at least partially positioned within the electrical wire receiving space defined by the cage. In the second position, the lever moves the spring away from the electrical contact to enlarge the electrical wire receiving space to receive the electrical wire. In the first position, the lever biases the cage, which biases the spring into contact with the electrical wire to securely retain the electrical wire within the electrical wire receiving space and in contact with the electrical contact.

In one embodiment, the lever includes a body portion and a lever arm extending from the body portion, the body portion includes a first cam arranged and configured to contact the cage when in the first position and a second cam arranged and configured to contact the spring in the second position.

In one embodiment, the body portion comprises a cylinder, the second cam being larger than the first cam so that the second cam extends from an outer surface of the body portion by a distance greater than a distance of the first cam.

In one embodiment, the first and second cams are rotationally offset relative to each other by ninety-degrees.

In one embodiment, the spring includes a first segment, a second segment extending from an end of the first segment, and a third segment extending from an end of the second segment.

In one embodiment, the third segment is arranged and configured to engage the cage.

In one embodiment, the first segment of the spring is in the form of a plate-like member including a downwardly extending ledge, the plate-like member resting on a top surface of the cage.

In one embodiment, the plate-like member includes an aperture arranged and configured to enable the lever to pass therethrough.

In one embodiment, in the second position, the second cam formed on the body portion of the lever contacts an inner surface of the ledge formed on the spring to move the spring away from the electrical contact.

In one embodiment, in the first position, the first cam formed on the body portion of the lever contacts the cage to move the cage and the spring towards the electrical contact to apply a supplemental force to retain the electrical wire within the electrical wire receiving space.

In one embodiment, the cage includes an opening arranged and configured to enable the electrical contact to pass therethrough.

In one embodiment, the cage include a first arm, a second arm, and a sidewall extending therebetween, the first and second arms each including an opening arranged and configured to enable the electrical contact to pass therethrough, the first and second arms and the sidewall partially defining the electrical wire receiving space.

In one embodiment, the lever is pivotable between the first and second positions.

In one embodiment, the spring includes a stab or sharpened edge portion arranged and configured to contact the electrical wire to provide additional retention force in maintaining the electrical wire in the electrical wire receiving space.

In one embodiment, the wire terminal includes first, second, and third levers, each of the first, second, and third levers being color-coded to indicate ground, neutral, and phase connection.

Disclosed herein is a wiring device. In one embodiment, the wiring device includes a housing and an electrical contact disposed at least partially within the housing and a wire terminal arranged and configured to mechanically and electrically secure a line-voltage AC electrical wire to the electrical contact. In one embodiment, the wire terminal includes a lever and a leaf spring. The lever is arranged and configured to pivot between a first position and a second position. The leaf spring including a first segment and a second segment, the first segment contacting the electrical contact, the second segment contacting the lever. In the second position, the spring is biased away from the electrical contact to enlarge an electrical wire receiving space to receive the electrical wire. In the first position, the lever compresses the spring into contact with the electrical wire to securely retain the electrical wire within the electrical wire receiving space and in contact with the electrical contact.

In one embodiment, the lever includes a first arcuate surface arranged and configured to contact the second segment of the spring in the first position and a second arcuate surface arranged and configured to contact the second segment of the spring in the second position.

In one embodiment, the first and second arcuate surfaces are angled relative to each other to define a transition point therebetween.

In one embodiment, the transition point provides resistance against movement of the lever out of the first position.

In one embodiment, during movement from the second position to the first position, the first arcuate surface is arranged and configured to bias the lever against the second segment of the spring when the transition point is overcome.

In one embodiment, the lever is pivotable.

In one embodiment, the electrical contact includes one or more arms defining a recess for receiving the first segment of the spring.

In one embodiment, the spring includes a stab or sharpened edge portion arranged and configured to contact the electrical wire to provide additional retention force in maintaining the electrical wire in the electrical wire receiving space.

In one embodiment, the wire terminal includes first, second, and third levers, each of the first, second, and third levers being color-coded to indicate ground, neutral, and phase connection.

BRIEF DESCRIPTION OF THE DRAWINGS

By way of example, a specific embodiment of the disclosed device will now be described, with reference to the accompanying drawings, in which.

Figure 1:
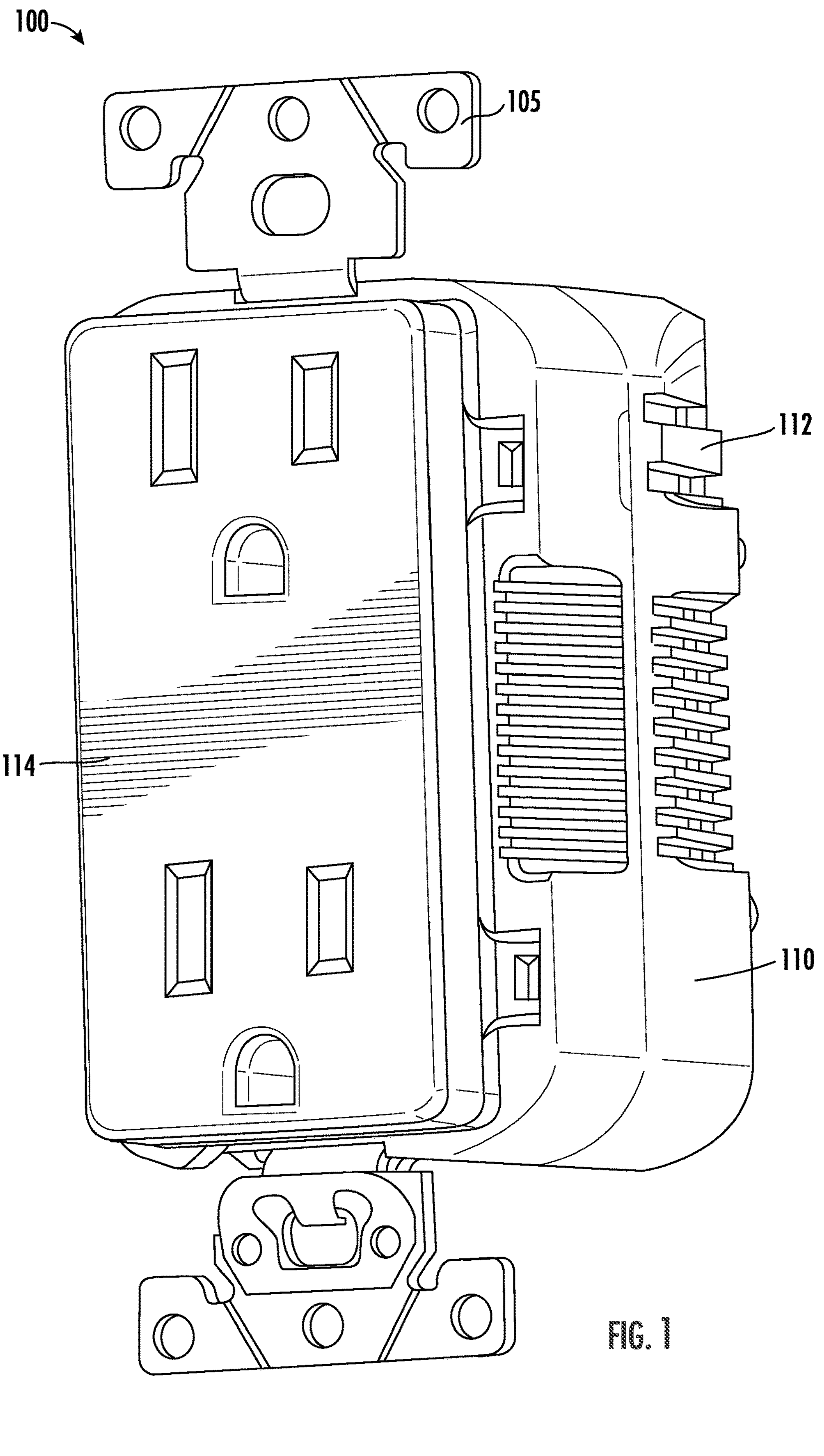
FIG. 1 illustrates a perspective view of an embodiment of a wiring device.

It should be understood that the drawings are not necessarily to scale and that the disclosed embodiments are sometimes illustrated diagrammatically and in partial views. In certain instances, details which are not necessary for an understanding of the disclosed methods and devices or which render other details difficult to perceive may have been omitted. It should be further understood that this disclosure is not limited to the particular embodiments illustrated herein. In the drawings, like numbers refer to like elements throughout unless otherwise noted.

DETAILED DESCRIPTION

Various features or the like of wire terminals or wire termination mechanisms (terms used interchangeably herein) and corresponding methods of use arranged and configured to enable a wire to be installed into a wiring device will now be described more fully hereinafter with reference to the accompanying drawings, in which one or more features of the wire terminals will be shown and described. It should be appreciated that the various features may be used independently of, or in combination, with each other. It will be appreciated that the various wire terminals as disclosed herein may be embodied in many different forms and should not be construed as being limited to the embodiments set forth herein. Rather, these embodiments are provided so that this disclosure will convey certain features of the wire terminals to those skilled in the art.

In accordance with one or more features of the present disclosure, various wire terminals arranged and configured to enable an installer to quickly and easily install, engage, couple, etc. one or more electrical wires to an electrical wiring device will be shown and described. As will be described herein, the wire terminals may be arranged and configured to enable an installer to quickly and easily install, engage, couple, etc. one or more electrical wires to an electrical wiring device without the need for any additional tools such as, for example, without the need for a screwdriver. Rather, as will be described herein, various embodiments utilizing a lever and spring to selectively engage or couple the wire to the wiring device (e.g., the wire terminal(s) are arranged and configured to mechanically and electrically secure an electrical wire to an electrical contact) will be shown and described.

It should be appreciated that the various wire terminals may be incorporated into any suitable wiring device arranged and configured to receive line-voltage, either now known or hereafter developed such as, for example, an electrical receptacle, a switch, a dimmer, an occupancy sensor, a lighting fixture, a ground/arc fault circuit interrupter, fan speed controls, energy management devices, surge suppressors, and the like. As such, it should be understood that the term "wiring device" is intended to include any of the standard line voltage electrical devices that are now known or hereafter developed. Line voltage refers to a voltage, typically Alternating Current (AC), that is supplied to buildings/residences (e.g., electric light and power), for example, 110 VAC, 115 VAC, 120 VAC, 125 VAC, 208 VAC, 220 VAC, 230 VAC, 240 VAC, single or multiphase. Line voltage devices are distinguished from low voltage devices, which refer to devices that receive a voltage which is less than a certain threshold (50 Volts for example, AC or DC). This reduced voltage is typically used for communication, signaling, data/multimedia transmission, low voltage charging, and the like. As such, the present disclosure should not be limited to any particular line voltage wiring device unless explicitly claimed. While the present disclosure describes and shows the wire terminals in combination with a line-voltage electrical device, it should be appreciated that the wire terminals may be used in connection with low-voltage electrical devices as well. Thus, the present disclosure should not be limited to line-voltage devices unless specifically claimed.

Referring to FIG. 1, an example embodiment of a wiring device 100 is shown. As will be appreciated, wiring devices are normally fastened to electrical boxes in walls and ceilings of buildings or in other suitable locations. For example, the wiring device 100 may include a housing 110 sized and configured as a single gang wall box mounted device. In various embodiments, the wiring device 100 also include a strap 105. The housing 110 may include rear and front cover portions 112, 114 that, when assembled, enclose a variety of components, although the housing may include more or less portions.

Referring to FIGS. 2-9, an example embodiment of a wire terminal 200 in accordance with one or more features of the present disclosure will be described. As will be appreciated by one of ordinary skill in the art, the wire terminal 200 may be incorporated into any wiring device such as, for example, wiring device 100.

As illustrated, in one embodiment, the wire terminal 200 includes a lever 210, a cage 230, a spring 250, and first and second pivot pins 270, 272. As will be described in greater detail herein, in one embodiment, the cage 230 is installed or coupled to a contact 120 of the wiring device 100. The spring 250 may be positioned within the cage 230. The spring 250 may be driven (e.g., moved, translated, etc.) by the movement of the lever 210.

Figure 2:
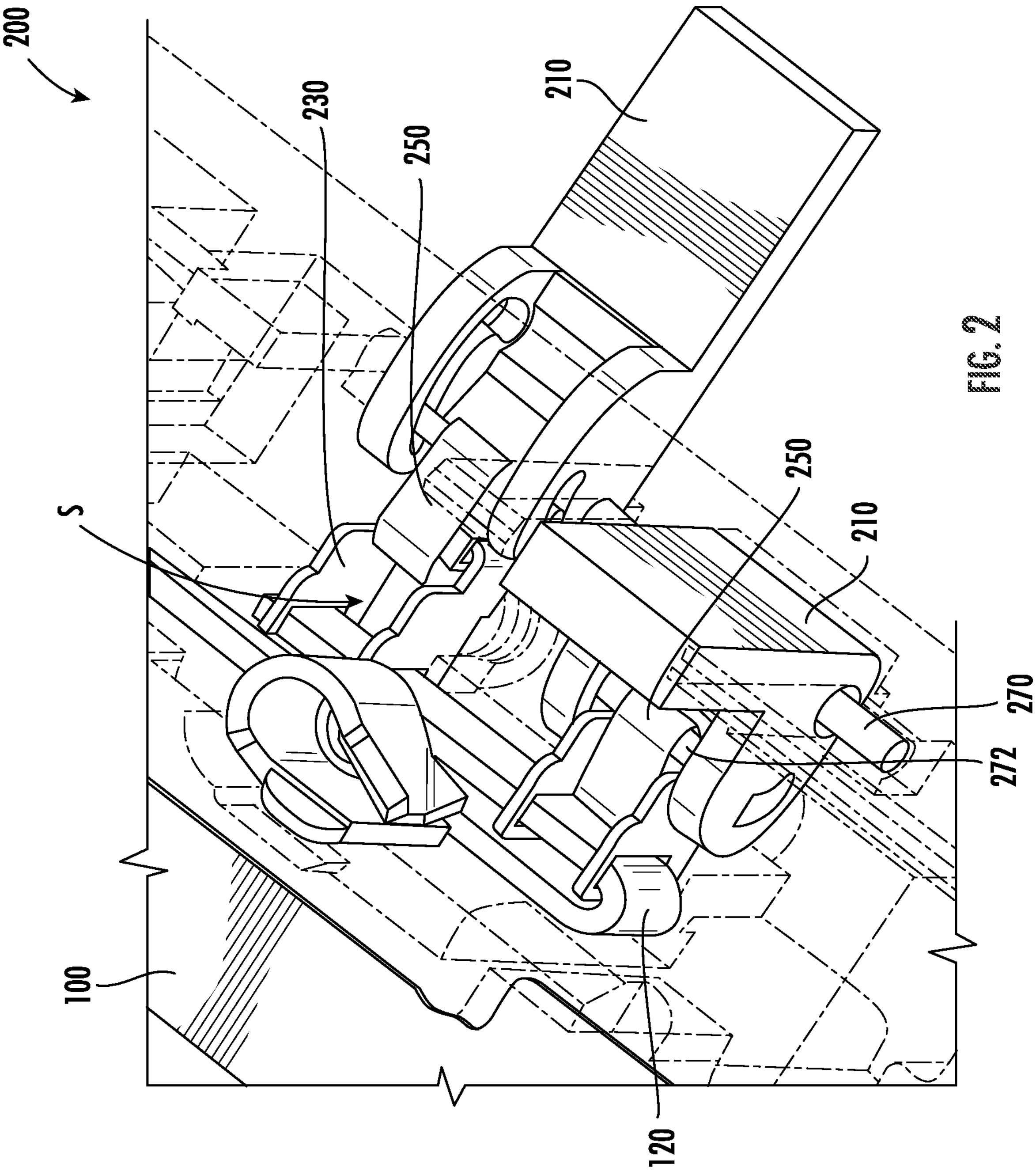
FIG. 2 illustrates a perspective view of an embodiment of a wire terminal that may be used in connection with the wiring device of FIG. 1 in accordance with one or more features of the present disclosure, the wire terminal being illustrated in a first position and a second position.
Figure 3:
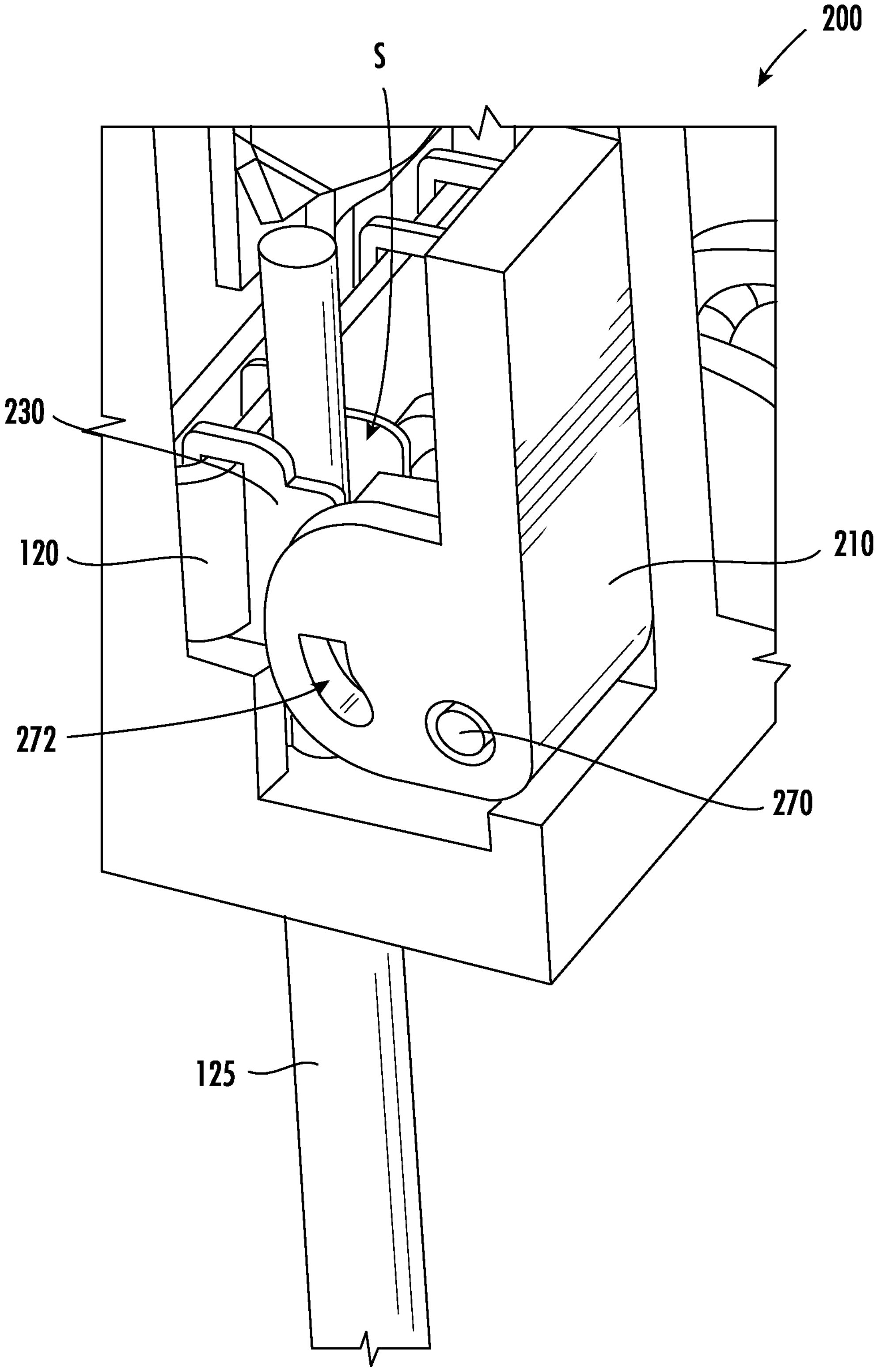
FIG. 3 illustrates a perspective view of the wire terminal of FIG. 2, the wire terminal illustrated in the first position.
Figure 4:
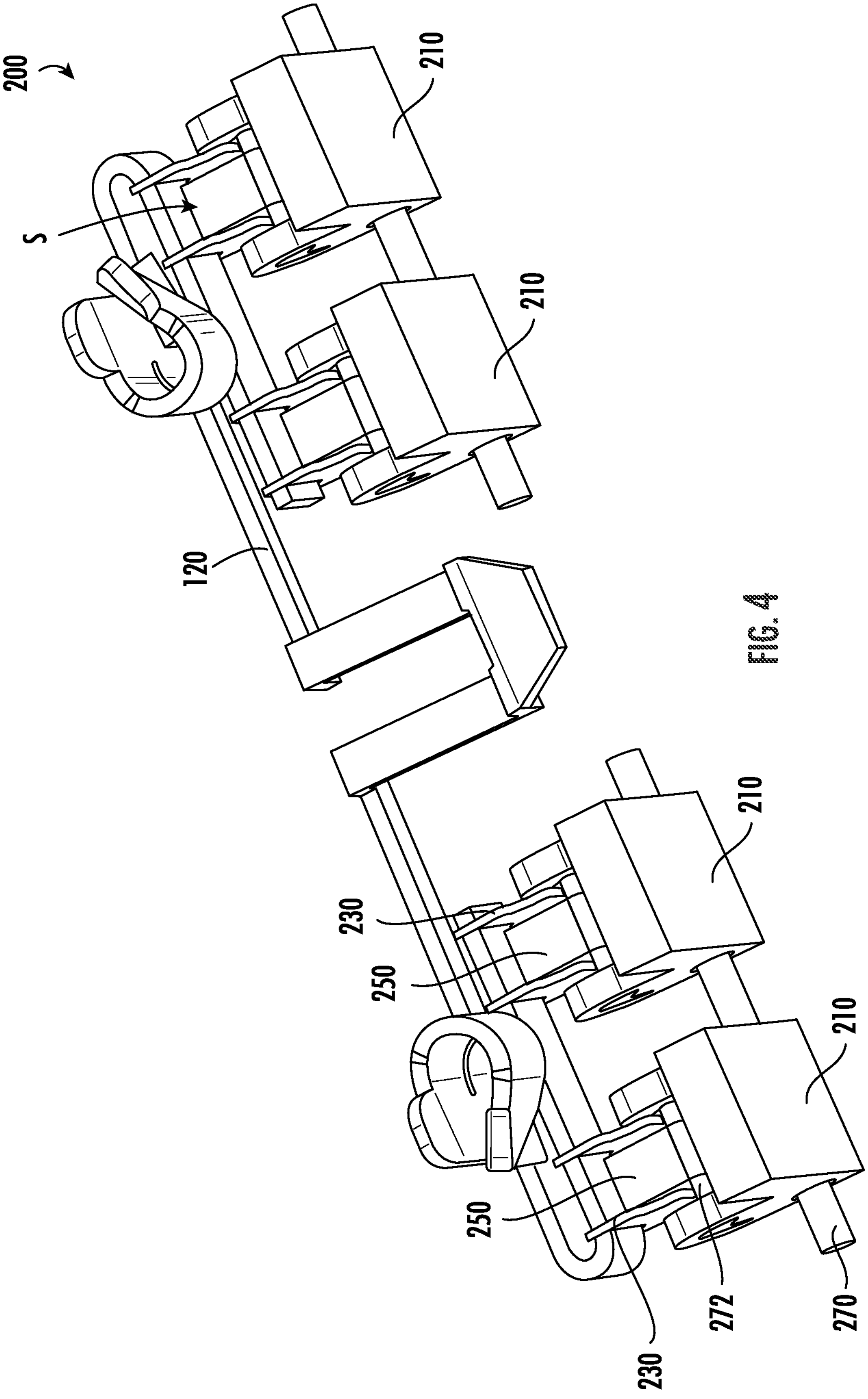
FIG. 4 illustrates a top perspective view of the wire terminal of FIG. 2, the wire terminal illustrated in the first position.

In use, the lever 210 is moveable between a first (e.g., closed) position (illustratively shown in FIGS. 2-5 and 9) and a second (e.g., opened) position (illustratively shown in FIG. 2). In one embodiment, as illustrated, the lever 210 may be vertically pivotable (e.g., axis of the pivot pin may extend parallel to a longitudinal axis of the wiring device 100). In use, as will be appreciated by one of ordinary skill in the art, the lever 210 extends from the housing 110 of the wiring device 100 so that, during installation, a user may move the lever 210 from the first position to the second position to insert an electrical wire 125 therein. Thereafter, once the electrical wire 125 has been inserted, the user may move the lever 210 from the second position to the first position to retain the wire 125 within the wire terminal 200.

As will also be appreciated by one of ordinary skill in the art, while the figures may illustrate a total of four levers, different numbers of levers, springs, etc. may be used depending on the wiring device.

In use, the lever 210 may be biased via the spring 250 to the first position. Thus arranged, in use, the lever 210 may be moved from the first position to the second position. In the second position, an electrical wire receiving space S is created or enlarged to enable a user to install the electrical wire 125 into the wire terminal 200 (e.g., in the second position, the electrical wire receiving space S may be enlarged a sufficient amount so that the electrical wire can be freely inserted into the electrical wire receiving space S without interference or resistance). In one embodiment, as will be described in greater detail below, the spring 250 is moved away from the contact 120 thereby creating or enlarging the electrical wire receiving space S for the electrical wire 125 to be inserted when the lever 210 is in the second position.

Once the wire 125 is installed into the electrical wire receiving space S, the lever 210 may be pivoted to the first position. In the first position, the lever 210 and/or the spring 250 may be arranged and configured to apply a supplemental force to retain the wire 125 within the electrical wire receiving space S and to ensure that the wire 125 remains in contact with the contact 120 of the wiring device 100. That is, in the first position, the spring 250 and/or the lever 210 are arranged and configured to provide an increased retention force to maintain the electrical wire 125 within the electrical wire receiving space S (e.g., the spring 250 is arranged and configured to press against the installed electrical wire 125). In addition, in one embodiment, the spring 250 may also be arranged and configured to "cut" into the electrical wire 125 to ensure contact is retained as will be described in greater detail below.

Referring to FIGS. 2-5 and 9, in one embodiment, the cage 230 is arranged and configured to couple, engage, etc. the electrical contact 120 of the wiring device 100. For example, referring to FIGS. 6 and 8, the cage 230 may include a first arm 232 and a second arm 234 arranged and configured to engage the contact 120. As illustrated, in one embodiment, each of the first and second arms 232, 234 may include an opening 236 formed therein arranged and configured to receive the contact 120, although it is envisioned that the cage 230 may be coupled to the contact 120 by alternative mechanisms. In one embodiment, the opening 236 may be sized and configured to receive the electrical contact (e.g., electrical bar) 120 such that micro-motion or movement of the cage 230 relative to the electrical contact 120 is possible. In use, the lever 210, after releasing the spring 250, and when moved to the first position exerts a force on the cage 230 (e.g., lateral sidewall 240) to provide additional force on the wire positioned within the electrical wire receiving space S from the spring 250. Thus arranged, in use, the opening 236 and the spring 250 may work together to achieve the function of securing wires of different gauges and/or construction (e.g., solid vs stranded wires and/or wires up to 12 gauge or a range of gauges).

As illustrated, the cage 230 may also include a lateral sidewall 240 extending between the first and second arms 232, 234. For example, as illustrated, the lateral sidewall 240 may be positioned at the ends of the first and second arms 232, 234 opposite the contact 120. Thus arranged, the cage 230 includes an electrical wire receiving space S arranged and configured to receive the electrical wire 125 therein. As illustrated, the electrical wire receiving space S may be defined by the inner surfaces of the contact 120, the first and second arms 232, 234, and the lateral sidewall 240. In use, the electrical wire receiving space S may be arranged and configured to receive a plurality different wire gauges and types. For example, the electrical wire receiving space S may be arranged and configured to receive 12 gauge, 14 gauge, etc. In addition, the electrical wire receiving space S may be arranged and configured to receive stranded wire, solid wire, etc. As illustrated, in one embodiment, the cage 230 may be monolithically formed. Alternatively, however, the cage 230 may be manufactured from multiple segments, which may be assembled together.

Figure 7:
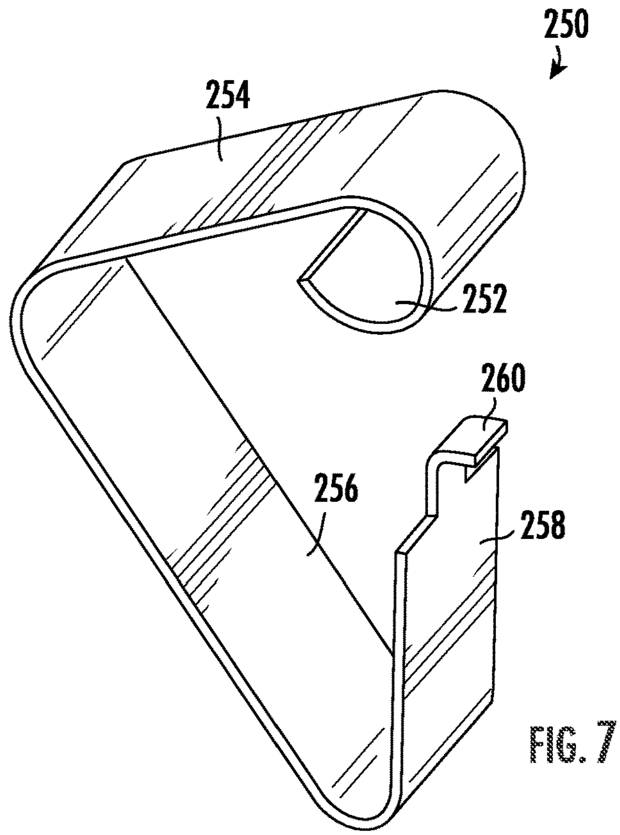
FIG. 7 illustrates a perspective view of an embodiment of a spring forming part of the wire terminal of FIG. 2.
Figure 8:
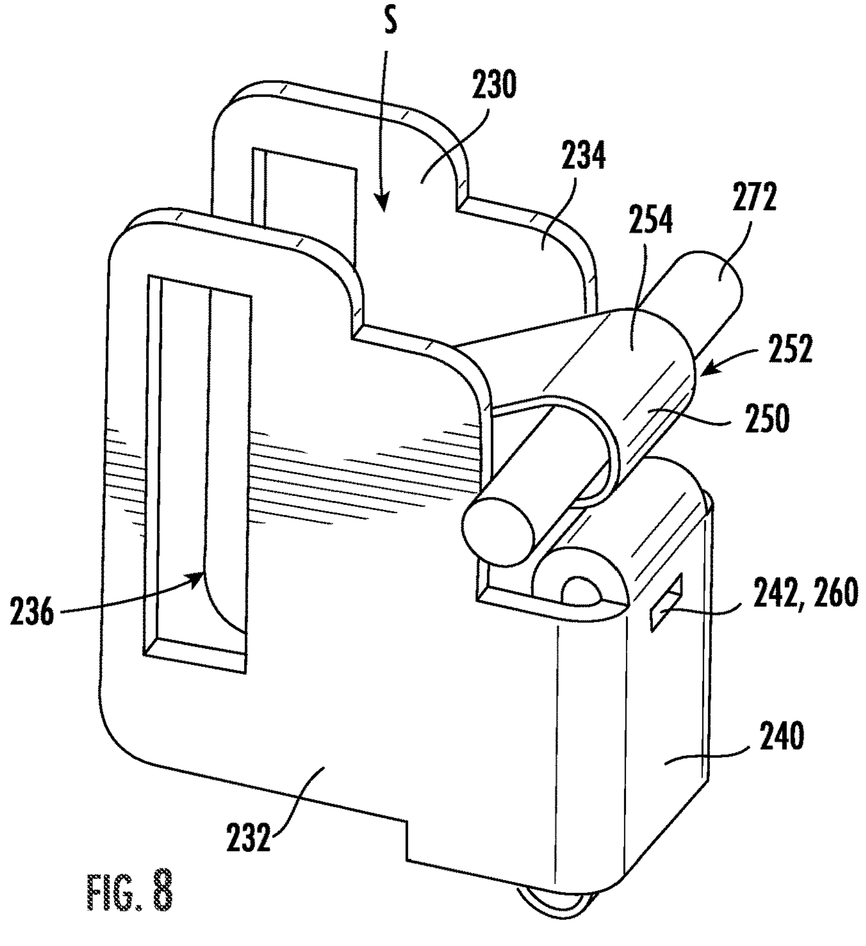
FIG. 8 illustrates a perspective view of an embodiment of the spring of FIG. 7 positioned within the cage of FIG. 6, the spring being coupled to a pivot pin in accordance with one or more features of the present disclosure.

Referring to FIGS. 7 and 8, in one embodiment, the spring 250 is arranged and configured to be received within the electrical wire receiving space S defined by the cage 230. In addition, as illustrated, the spring 250 may include an opening, an aperture, a bore, etc. 252 (terms used interchangeably herein without the intent to limit) arranged and configured to receive the second pivot pin 272. As illustrated, in one embodiment, the spring 250 may include a first segment 254 including the aperture 252 arranged and configured to receive the second pivot pin 272, a second segment 256 extending from an end of the first segment 254 (e.g., opposite the aperture 252), and a third segment 258 extending from an end of the second segment 256. The third segment 258 may be arranged and configured to engage the cage 230 such as, for example, the third segment 258 may include a hook or projection 260 arranged and configured to be received within an opening 242 formed in the lateral sidewall 240 of the cage 230. As illustrated, in one embodiment, the spring 250 may be monolithically formed. Alternatively, however, the spring 250 may be manufactured from multiple segments, which may be assembled together.

Figure 5:
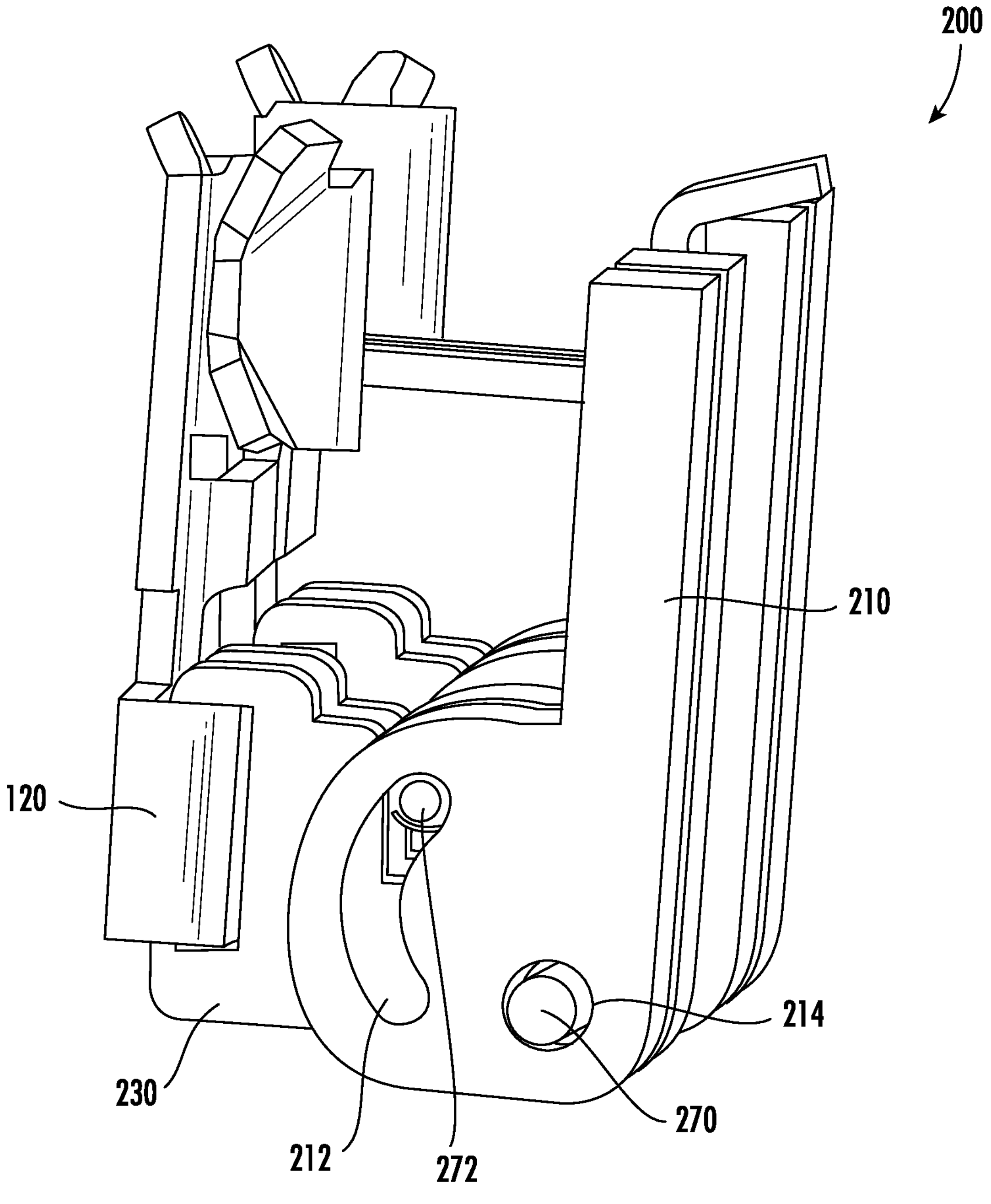
FIG. 5 illustrates a side perspective view of the wire terminal of FIG. 2, the wire terminal illustrated in the first position.
Figure 6:
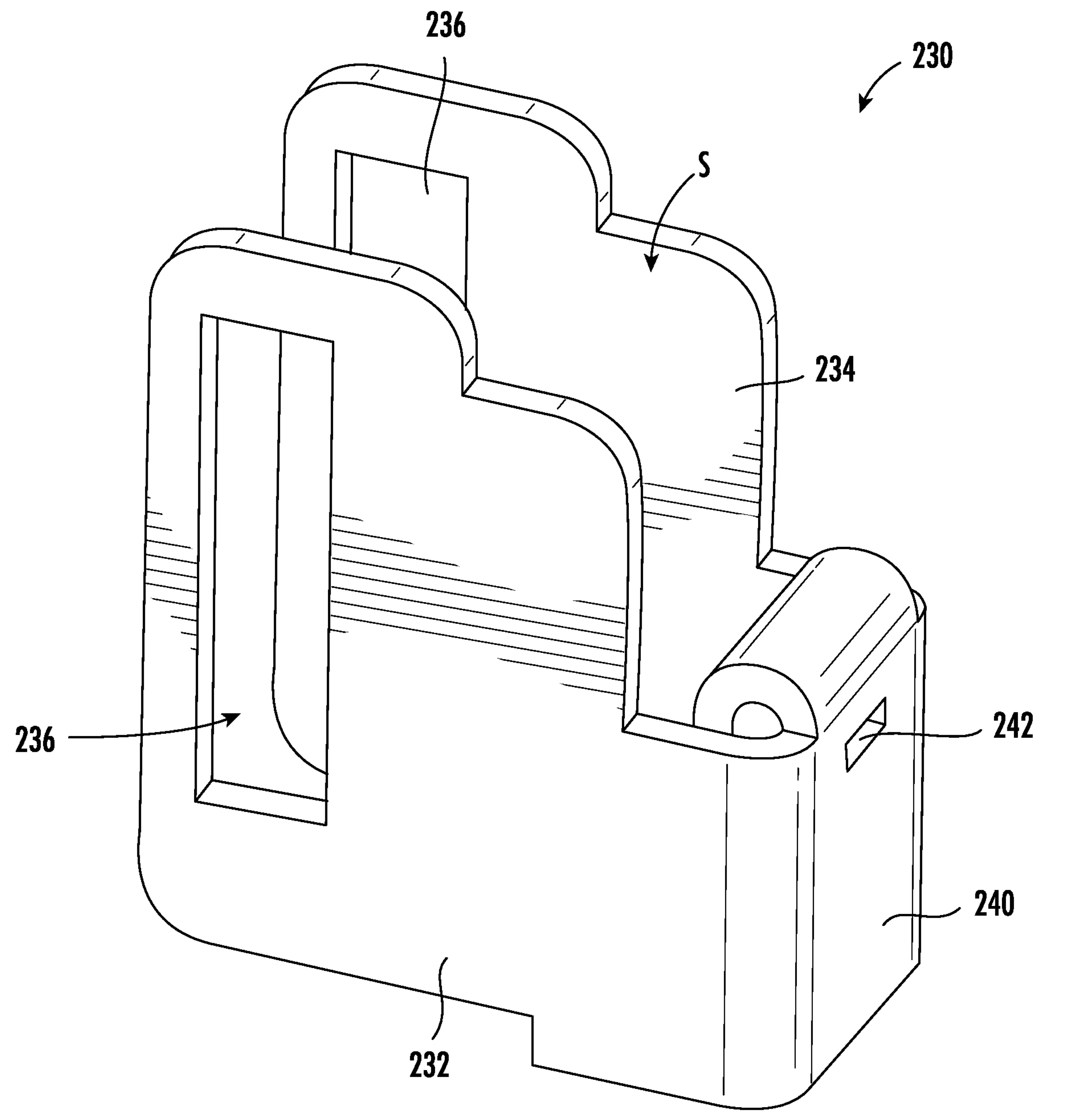
FIG. 6 illustrates a perspective view of an embodiment of a cage forming part of the wire terminal of FIG. 2.
Figure 9:
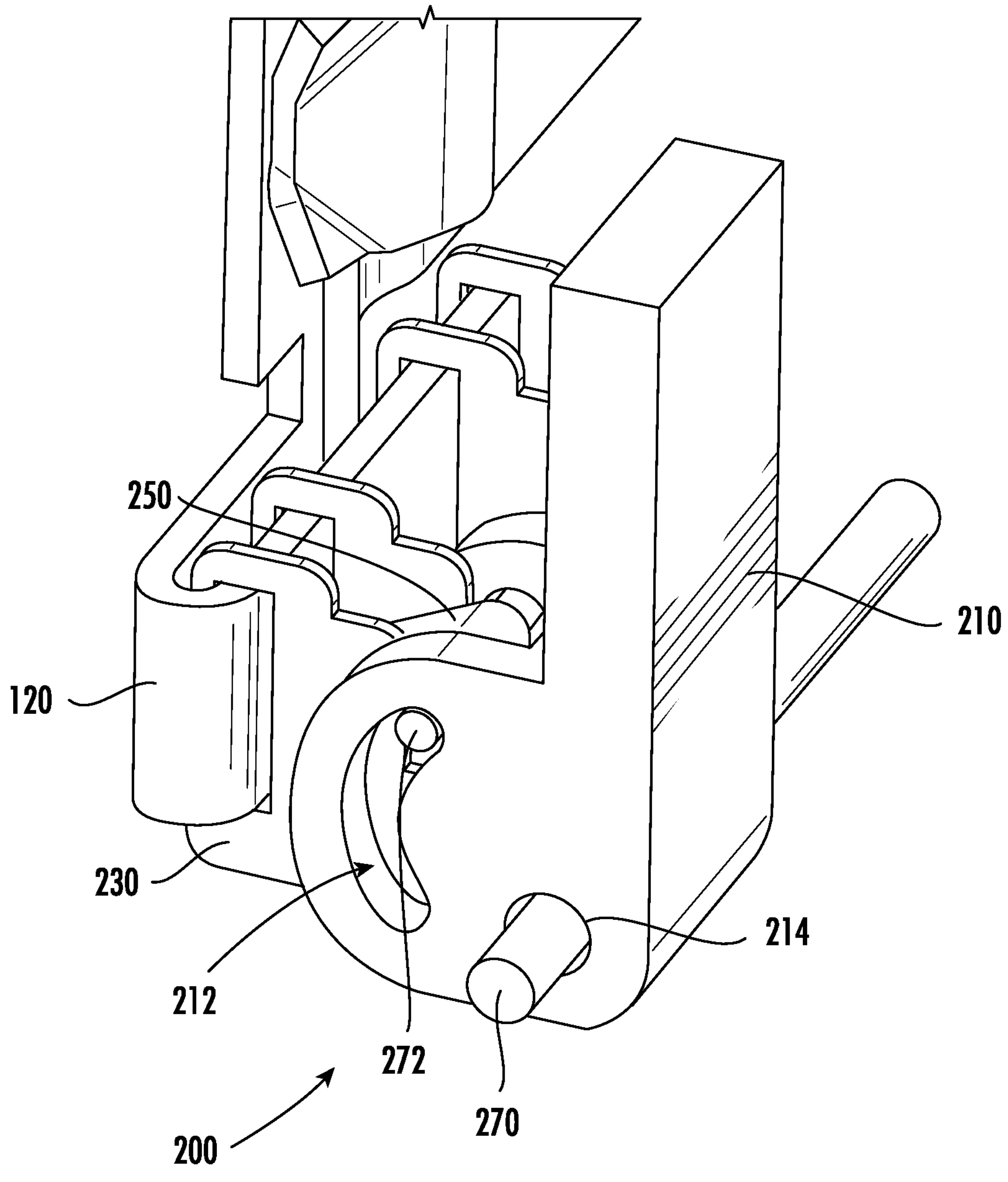
FIG. 9 illustrates a side perspective view of the wire terminal of FIG. 2, the wire terminal illustrated in the first position.

Referring to FIGS. 5 and 9, in one embodiment, the lever 210 may include an elongated arcuate slot 212 for receiving the second pivot pin 272 that passes through the spring 250 and a second opening, aperture, borehole, etc. 214 (terms used interchangeably herein without the intent to limit) arranged and configured to receive the first pivot pin 270. Thus arranged, in use, the lever 210 may be moved (e.g., pivoted, rotated, etc.) about the first pivot pin 270 passing through the lever 210. In addition, movement of the lever 210 from the first position to the second position, causes the second pivot pin 272 passing through the spring 250 to interact with the elongated arcuate slot 212, which causes the spring 250 to move away from the contact 120 thereby creating or enlarging the electrical wire receiving space S defined by the inner surfaces of the contact 120, cage 230, and spring 250.

In one embodiment, as previously mentioned, the spring 250 is preferably arranged and configured to bias the lever 210 to the first position. Thus arranged, the spring 250 assists with providing increased retention force to maintain the electrical wire 125 within the electrical wire receiving space S (e.g., in the first position, with the electrical wire 125 positioned within the electrical wire receiving space S, the spring 250 pushes against the electrical wire 125 to provide increased retention force on the wire 125 against the contact 120).

Figure 10:
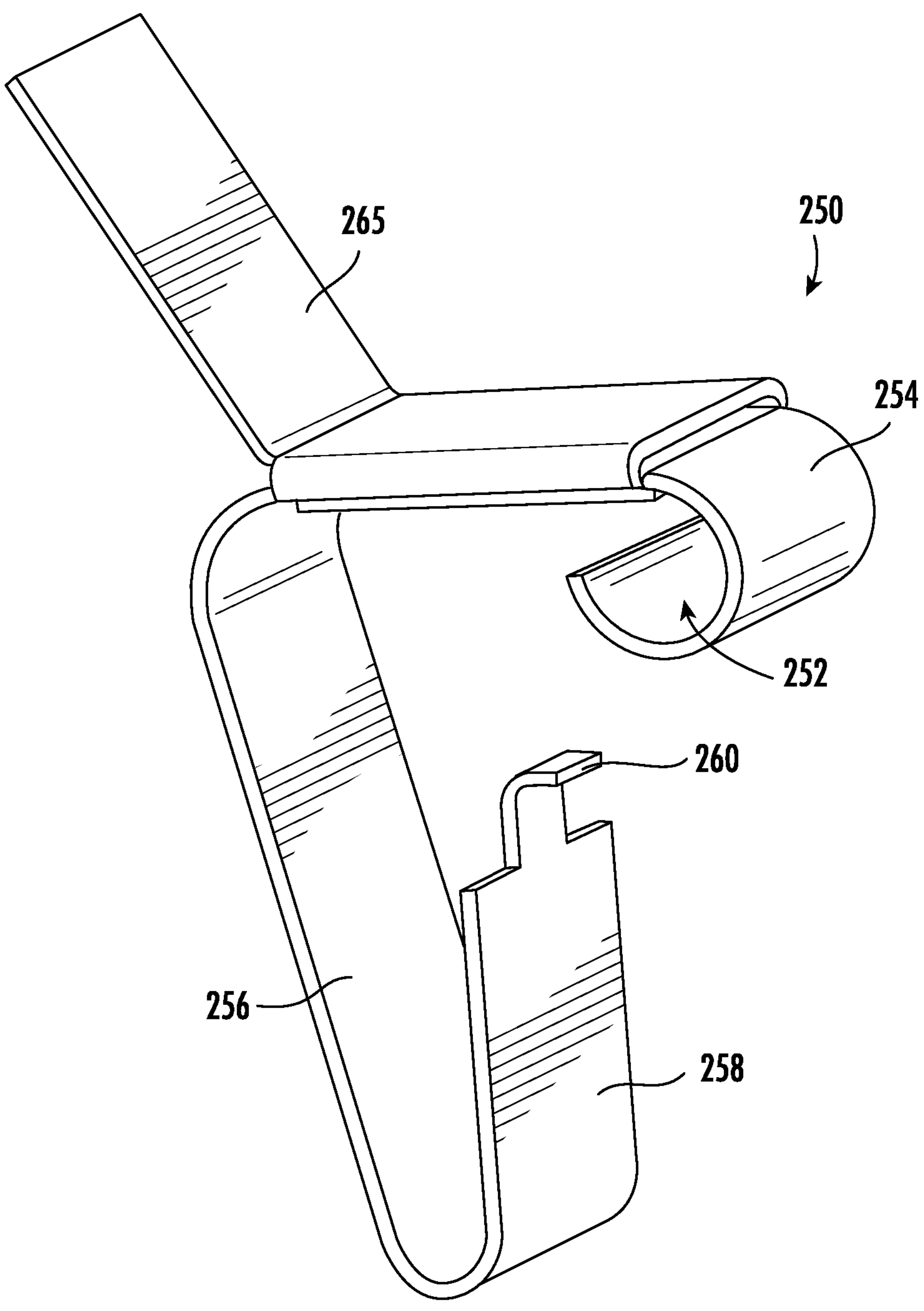
FIG. 10 illustrates a perspective view of an alternate embodiment of a spring in accordance with one or more features of the present disclosure.

Referring to FIG. 10, in one embodiment, the spring 250 may include an additional geometry, a secondary component or arm, etc. 265 arranged and configured to engage the electrical wire 125. For example, the spring 250 may include a stab 265 (e.g., a sharpened edge portion) extending from the spring 250, the stab 265 arranged and configured to engage or bite into the electrical wire 125 to provide additional retention force in maintaining the wire 125 in the electrical wire receiving space S in the first position.

Referring to FIGS. 11-18, an alternate example embodiment of a wire terminal 300 in accordance with one or more features of the present disclosure will be described. As will be appreciated by one of ordinary skill in the art, the wire terminal 300 may be incorporated into any wiring device such as, for example, wiring device 100.

As illustrated, in one embodiment, the wire terminal 300 includes a lever 310, a cage 330, and a spring 350. As will be described in greater detail herein, in one embodiment, the cage 330 is installed or coupled to the contact 120 of the wiring device 100. The spring 350 may be positioned within the cage 330. The spring 350 may be driven (e.g., moved, translated, etc.) by the movement of the lever 310.

Figure 11:
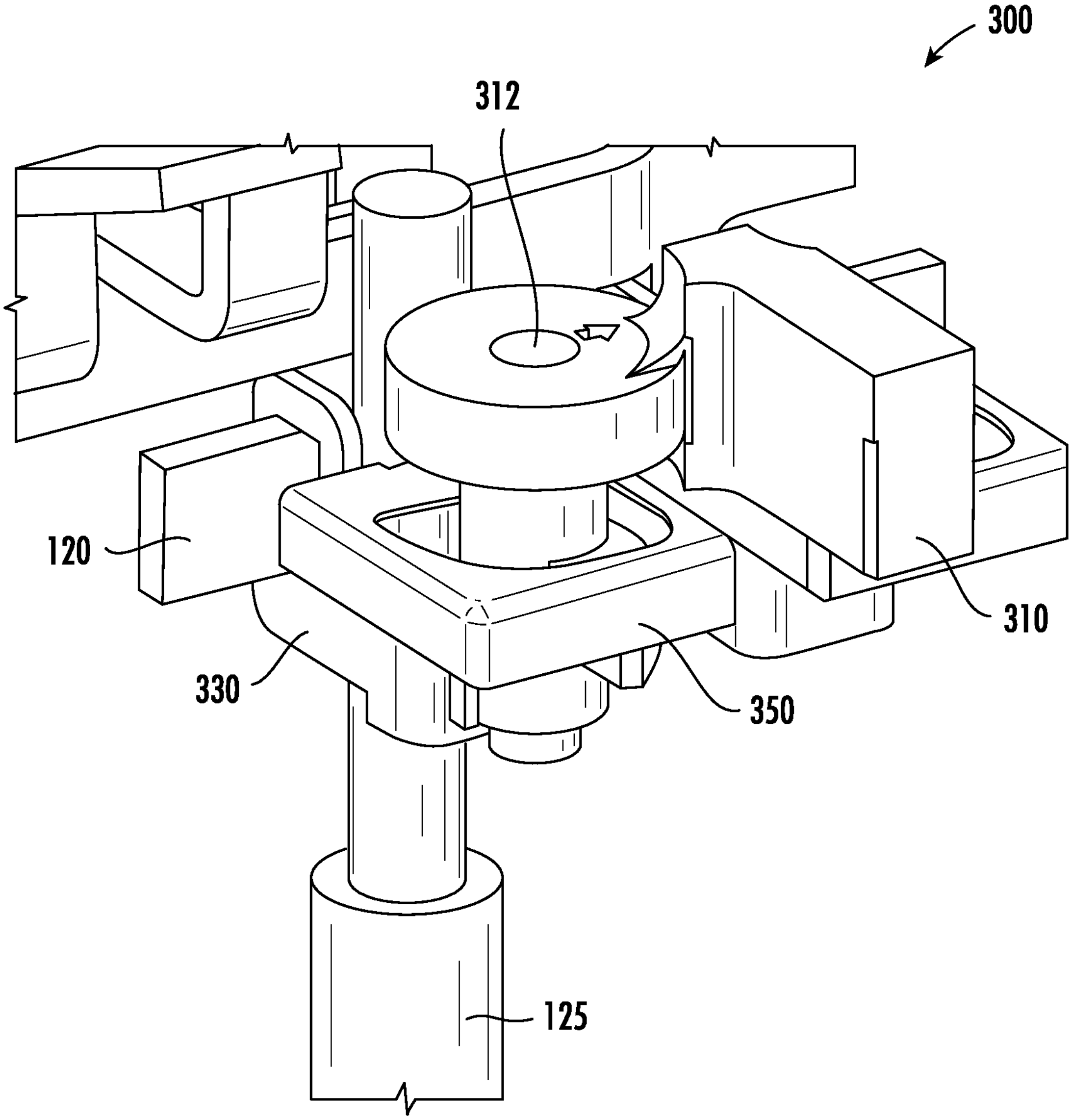
FIG. 11 illustrates a perspective view of an alternate embodiment of a wire terminal that may be used in connection with the wiring device of FIG. 1 in accordance with one or more features of the present disclosure, the wire terminal being illustrated in a second position.
Figure 12:
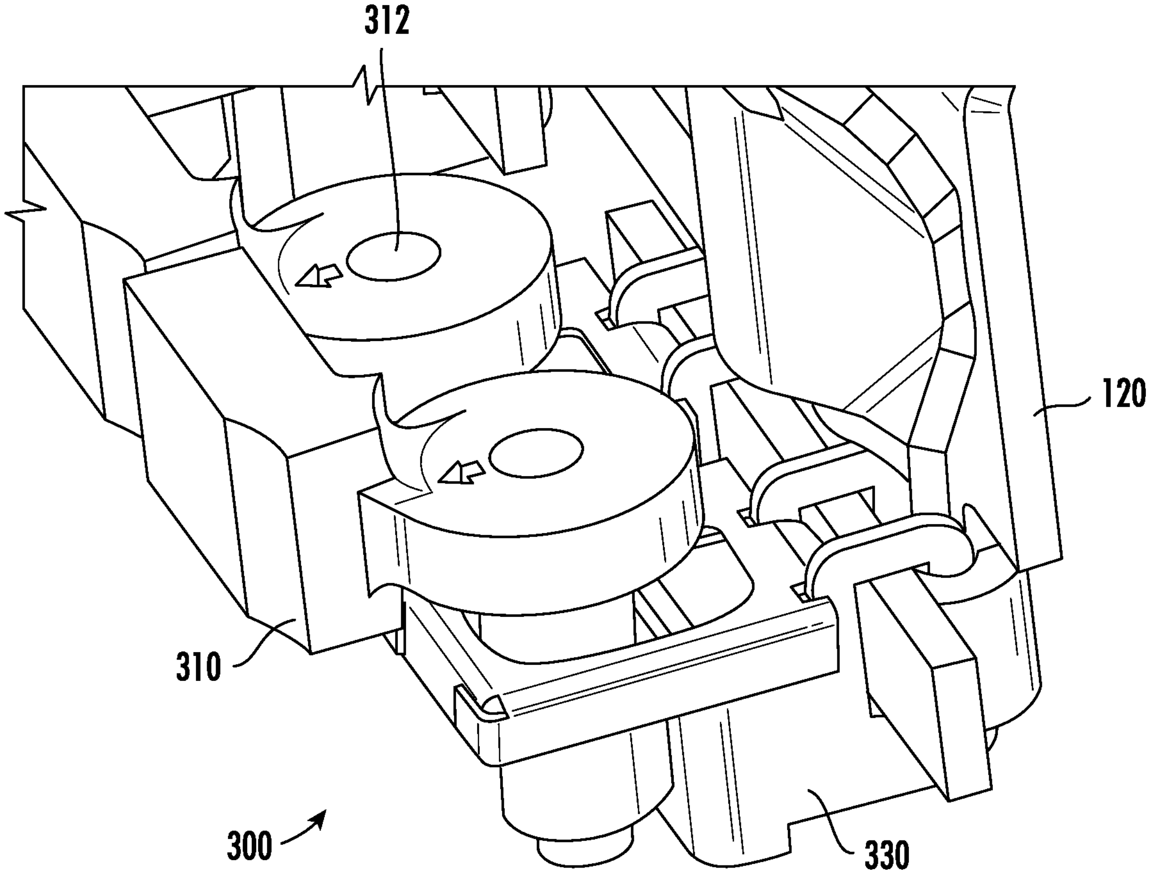
FIG. 12 illustrates a perspective view of the wire terminal of FIG. 11, the wire terminal illustrated in the first position.
Figure 13:
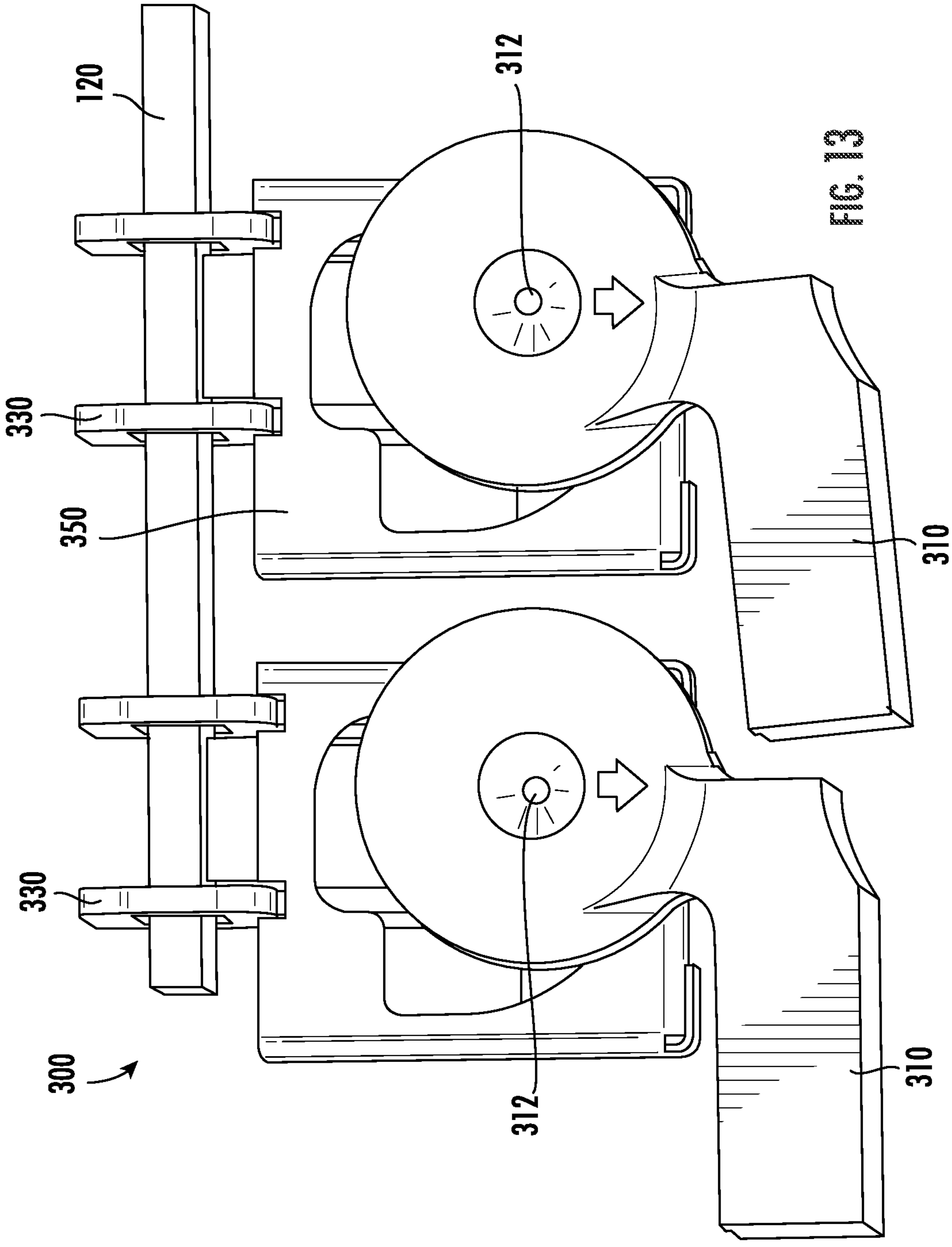
FIG. 13 illustrates a top perspective view of the wire terminal of FIG. 11, the wire terminal illustrated in the first position.

In use, the lever 310 is moveable between a first position (illustratively shown in FIGS. 12-16) and a second position (illustratively shown in FIG. 11). In one embodiment, as illustrated, the lever 310 may be horizontally pivotable (e.g., pivot axis extends in a vertical direction within the housing 110 of the wiring device 100, e.g., perpendicular to a longitudinal axis of the wiring device 100). However, in one embodiment, the lever 310 may be vertically pivotable (e.g., pivot axis extends in a horizontal direction within the housing 110 of the wiring device 100, e.g., parallel to a longitudinal axis of the wiring device 100). In either scenario, in use, as will be appreciated by one of ordinary skill in the art, the lever 310 may extend from the housing 110 of the wiring device 100 so that, during installation, a user may move the lever 310 from the first position to the second position to insert the electrical wire 125 therein. Thereafter, once the electrical wire 125 has been inserted, the user may move the lever 310 from the second position to the first position. As illustrated, in one embodiment, the lever 310 may include recesses or openings 312 formed in the top and bottom surfaces thereof. In use, the recesses or openings 312 may be used to couple to the housing 110 of the wiring device 100 and to provide a pivot point about which to rotate (e.g., housing 110 may include one or more pins, bosses, etc. to couple with the recesses 312 formed in the lever 310).

As will also be appreciated by one of ordinary skill in the art, while the figures may illustrate a total of two levers, different numbers of levers, springs, etc. may be used depending on the wiring device.

Figure 18:
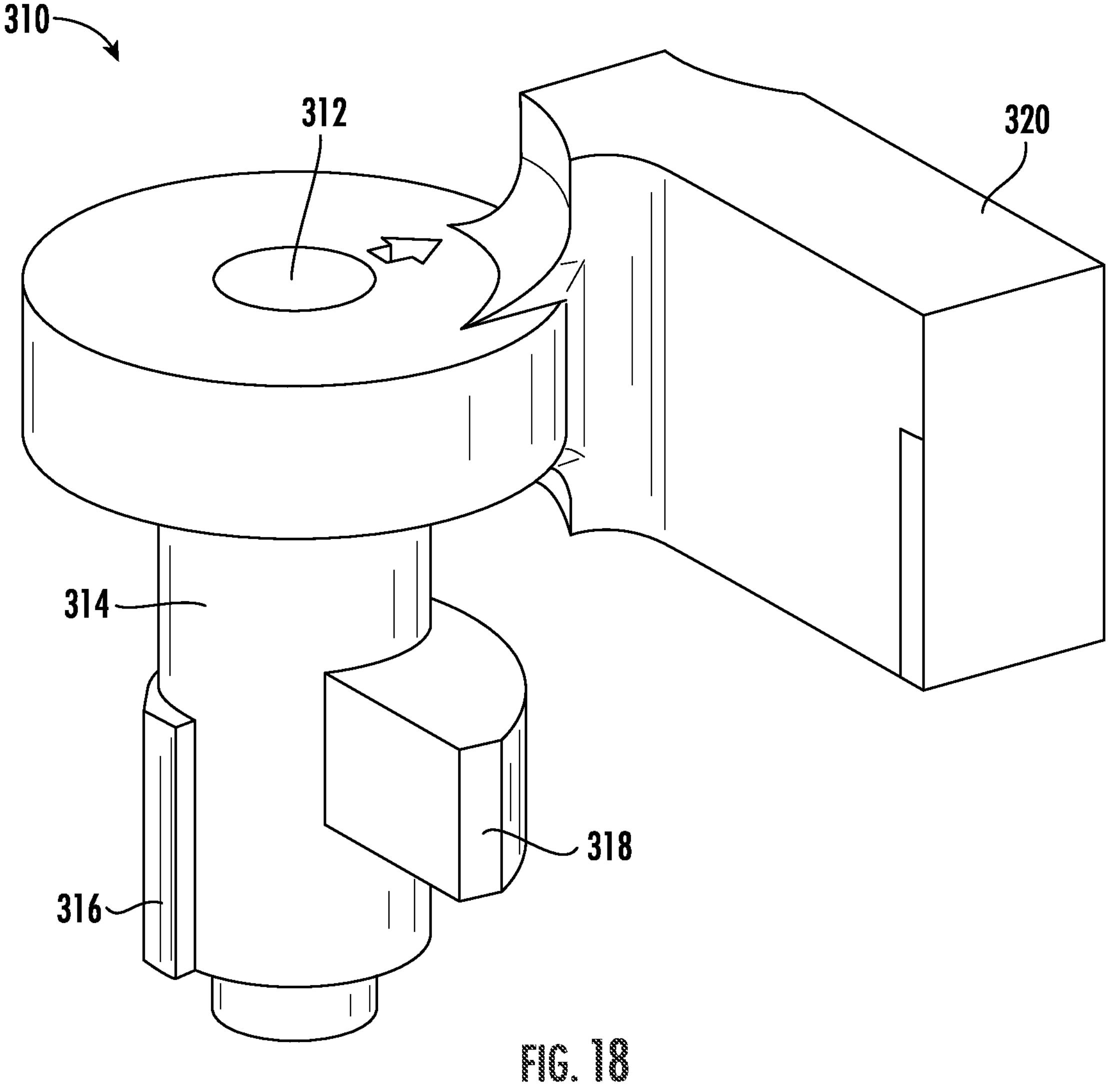
FIG. 18 illustrates a perspective view of an embodiment of a lever forming part of the wire terminal of FIG. 11.

In one embodiment, as best illustrated in FIG. 18, the lever 310 may include a body portion 314 such as, for example, a stem, a cylinder, etc. and a lever arm 320 extending from the body portion 314 such as, for example, from a top end thereof. As illustrated, in one embodiment, the body portion 314 may include a first cam 316 arranged and configured to contact the cage 330 when in the first position and a second cam 318 arranged and configured to contact the spring 350 in the second position. In one embodiment, the second cam 318 may be larger than the first cam 316 (e.g., the second cam 318 may extend from the outer surface or circumference of the body portion 314 by a second distance that is greater than the first distance by which the first cam 316 extends away from the outer surface or circumference). In use, the first cam 316 contacts the cage 330 increasing the pressure on the electrical wire 125 when the lever arm 320 is rotated to the first position. The second cam 318 contacts the spring 350 causing the spring 350 to open thereby creating or enlarging the electrical wire receiving space S to enable the user to install the electrical wire 125 into the wire terminal 300 when the lever arm 320 is rotated to the second position. As illustrated, in one position, the first and second cams 316, 318 may be rotationally offset relative to each other by approximately ninety-degrees or some other suitable angle.

Figure 16:
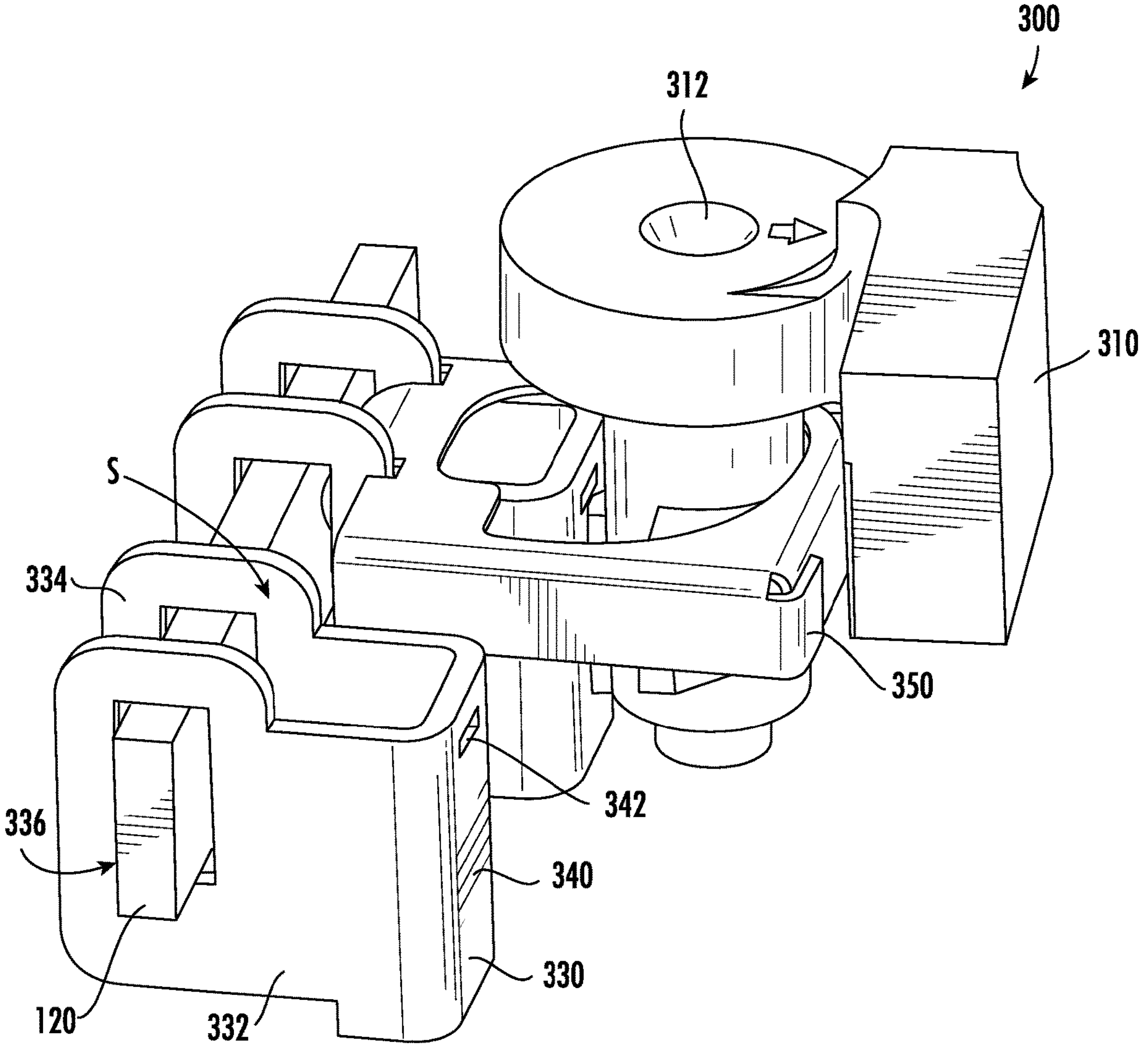
FIG. 16 illustrates an alternate perspective view of the wire terminal of FIG. 11, the wire terminal illustrated in the first position.

In one embodiment, as best illustrated in FIG. 16, the cage 330 is arranged and configured to couple, engage, etc. the electrical contact 120 of the wiring device 100. For example, as illustrated, the cage 330 may include a first arm 332 and a second arm 334 arranged and configured to engage the contact 120. As illustrated, in one embodiment, each of the first and second arms 332, 334 may include an opening 336 formed therein arranged and configured to receive the contact 120, although it is envisioned that the cage 330 may be coupled to the contact 120 by alternative mechanisms. In one embodiment, the opening 336 may be sized and configured to receive the electrical contact (e.g., electrical bar) 120 such that micro-motion or movement of the cage 330 relative to the electrical contact 120 is possible. In use, the lever 310, after releasing the spring 250, and when moved to the first position exerts a force on the cage 330 (e.g., lateral sidewall 340) to provide additional force on the wire positioned within the electrical wire receiving space S from the spring 350. Thus arranged, in use, the opening 336 and the spring 350 may work together to achieve the function of securing wires of different gauges and/or construction (e.g., solid vs stranded wires and/or wires up to 12 gauge or a range of gauges).

As illustrated, the cage 330 may also include a lateral sidewall 340 extending between the first and second arms 332, 334. For example, as illustrated, the lateral sidewall 340 may be positioned at the end of the first and second arms 332, 334 opposite the contact 120. Thus arranged, the cage 330 includes an electrical wire receiving space S arranged and configured to receive the electrical wire 125 therein. As illustrated, the electrical wire receiving space S may be defined by the inner surfaces of the contact 120, the first and second arms 332, 334, and the lateral sidewall 340. In use, the electrical wire receiving space S may be arranged and configured to receive a plurality different wire gauges and types. For example, the electrical wire receiving space S may be arranged and configured to receive 12 gauge, 14 gauge, etc. In addition, the electrical wire receiving space S may be arranged and configured to receive stranded wire, solid wire, etc. As illustrated, in one embodiment, the cage 330 may be monolithically formed. Alternatively, however, the cage 330 may be manufactured from multiple segments, which may be assembled together.

Figure 14:
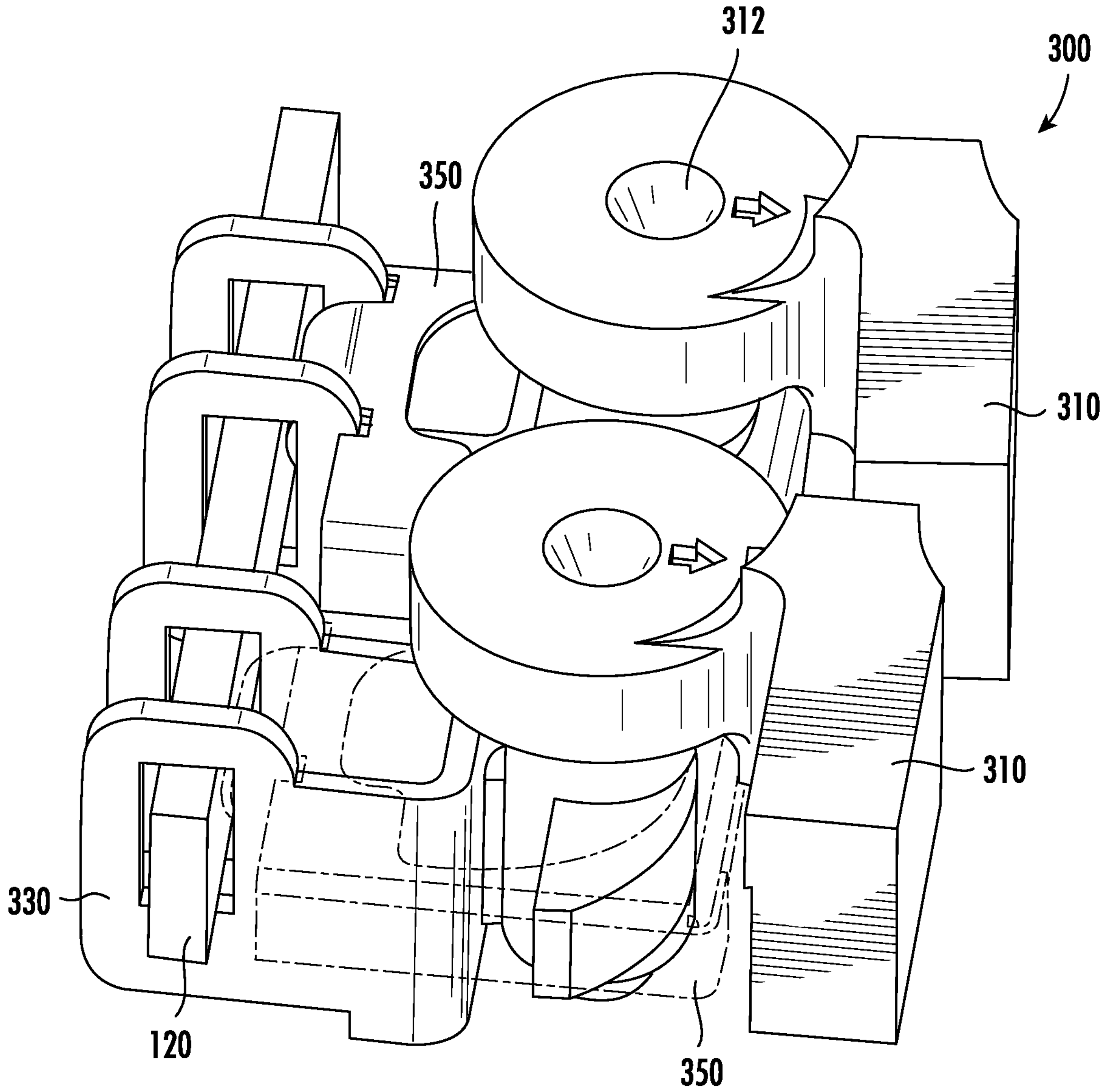
FIG. 14 illustrates an alternate perspective view of the wire terminal of FIG. 11, the wire terminal illustrated in the first position.
Figure 15:
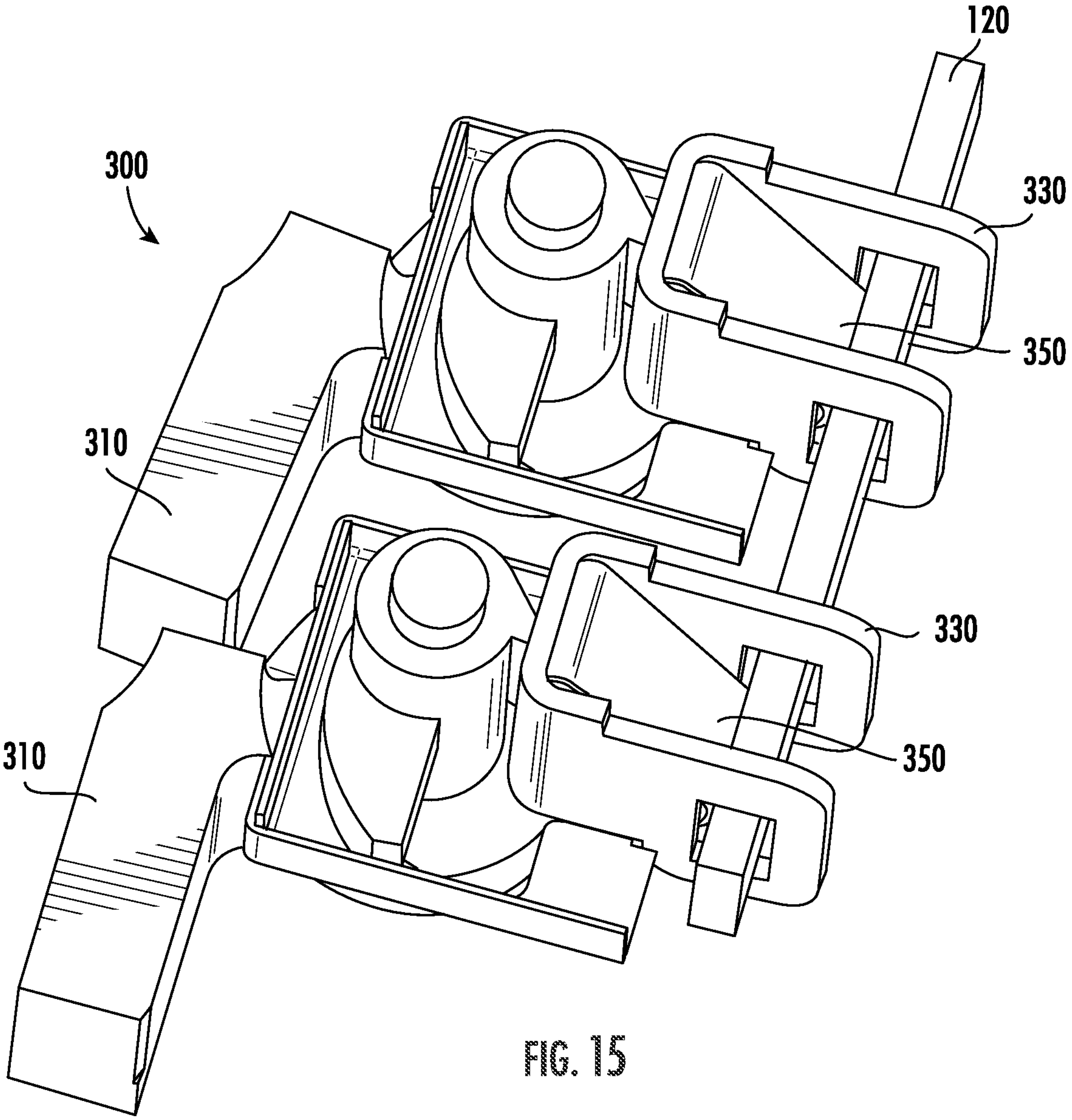
FIG. 15 illustrates a bottom perspective view of the wire terminal of FIG. 11, the wire terminal illustrated in the first position.
Figure 17:
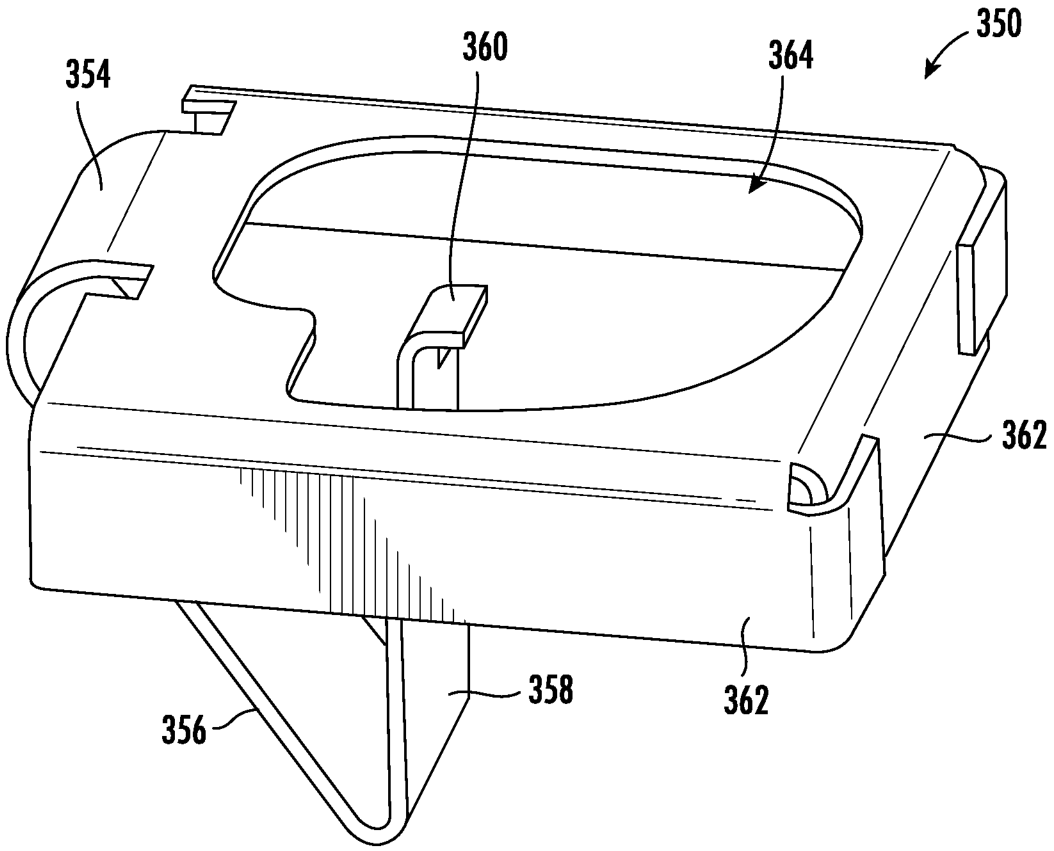
FIG. 17 illustrates a perspective view of an embodiment of a spring forming part of the wire terminal of FIG. 11.

Referring to FIGS. 14, 15, and 17, in one embodiment, at least a portion of the spring 350 is arranged and configured to be received within the electrical wire receiving space S defined by the cage 330. As best illustrated in FIG. 17, in one embodiment, the spring 350 may include a first segment 354, a second segment 356 extending from an end of the first segment 354, and a third segment 358 extending from an end of the second segment 356. The third segment 358 may be arranged and configured to engage the cage 330 such as, for example, the third segment 358 may include a hook or projection 360 arranged and configured to be received within an opening 342 formed in the lateral sidewall 340 of the cage 330.

As illustrated, in one embodiment, the spring 350 may be monolithically formed. Alternatively, however, the spring 350 may be manufactured from multiple segments, which may be assembled together.

In one embodiment, as illustrated, the first segment 354 of the spring 350 may be in the form of a cap or plate-like member. The plate-like first segment 354 may include a downwardly extending ledge 362. Thus arranged, in use, the spring 350 is arranged and configured so that the cap or plate-like first segment 354 sits on, rests, etc. the cage 330 with the partial circumference ledge 362 extending about the cage 330 while the second and third segments 356, 358 of the spring 350 reside within the electrical wire receiving space S defined by the cage 330. As illustrated, the cap or plate-like first segment 354 of the spring 350 includes an opening, an aperture, a bore, etc. 364 (terms used interchangeably herein without the intent to limit) formed therein, the aperture 364 being arranged and configured to enable the lever 310 to pass therethrough.

In use, the lever 310 may be moved from the first position to the second position. In the second position, the second, larger cam 318 formed on the body portion 314 of the lever 310 contacts an inner surface of the ledge 362 formed on the spring 350 to displace or move the spring 350 away from the contact 120 of the wiring device 100. Thus arranged, the second, larger cam 318 causes the spring 350 to open thereby creating or enlarging the electrical wire receiving space S to enable the user to install the electrical wire 125 into the wire terminal 300.

Once the wire 125 is installed, the lever 310 may be pivoted to the first position. In the first position, the first cam 316 formed on the body portion 314 of the lever 310 contacts the cage 330 (e.g., outer surface of the lateral sidewall 340 of the cage 330). Thus arranged, the first cam 316 pushes or moves the cage 330, and hence the spring 350, towards the contact 120 to apply a supplemental force to retain the wire 125 within the electrical wire receiving space S (e.g., the first cam 316 contacts the cage 330 to increase the pressure on the electrical wire 125) and to ensure that the wire 125 remains in contact with the contact 120 of the wiring device 100. That is, in the first position, the lever 310, cage 330, and spring 350 are arranged and configured to provide an increased retention force to maintain the electrical wire 125 within the electrical wire receiving space S (e.g., the spring 350 is arranged and configured to press against the installed electrical wire 125).

In one embodiment, as previously mentioned, the spring 350 may also include an additional geometry, a secondary component or arm, etc. arranged and configured to engage the electrical wire 125. For example, the spring 350 may include a stab (e.g., a sharpened edge portion) extending from the spring 350, the stab arranged and configured to engage or bite into the electrical wire 125 to provide additional retention force in maintaining the wire 125 in the electrical wire receiving space S in the first position.

Referring to FIGS. 19-22B, an alternate example embodiment of a wire terminal 400 in accordance with one or more features of the present disclosure will be described. As will be appreciated by one of ordinary skill in the art, the wire terminal 400 may be incorporated into any wiring device such as, for example, wiring device 100.

In one embodiment, the wire terminal 400 includes a lever 410, a spring 450, and a pivot pin 470. As will be described in greater detail herein, in one embodiment, the spring 450 is coupled to the contact 120 of the wiring device 100. The spring 450 may be driven (e.g., compressed) by the movement of the lever 410.

Figure 19:
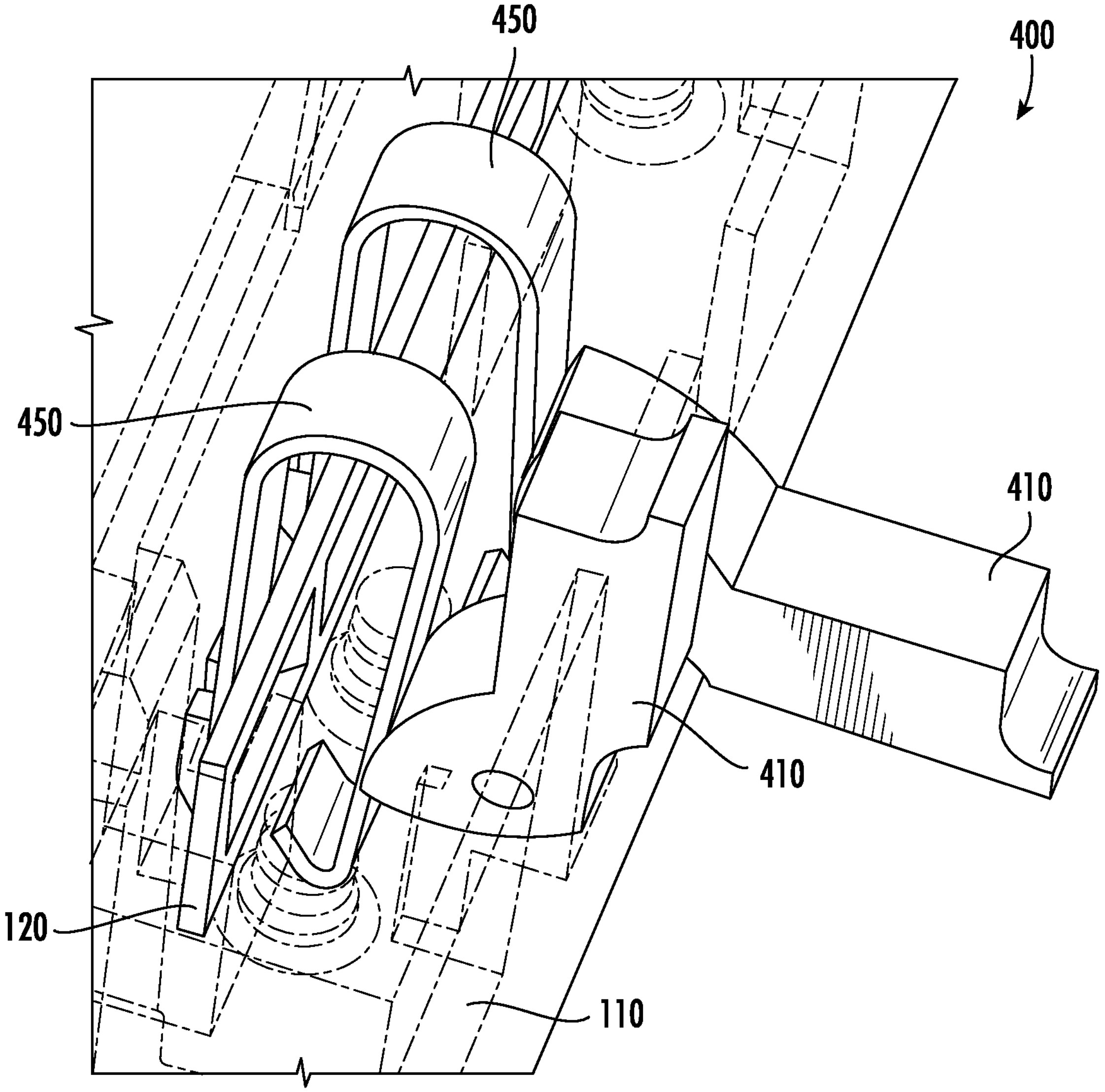
FIG. 19 illustrates a perspective view of an alternate embodiment of a wire terminal that may be used in connection with the wiring device of FIG. 1 in accordance with one or more features of the present disclosure, the wire terminal being illustrated in a first position and a second position.
Figure 20:
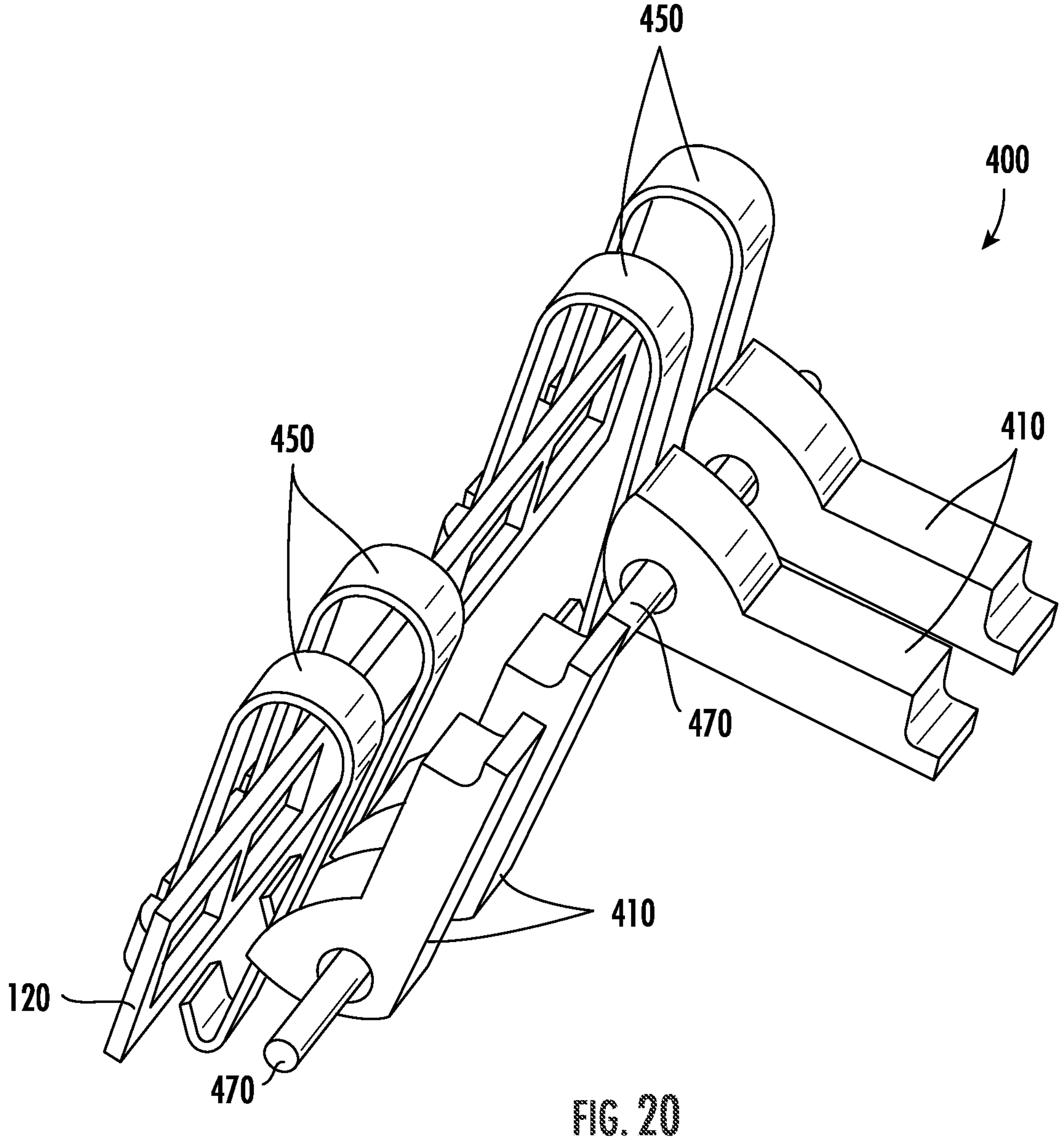
FIG. 20 illustrates a perspective view of the wire terminal of FIG. 19, the wire terminal illustrated in the first position and the second position.
Figure 22A:
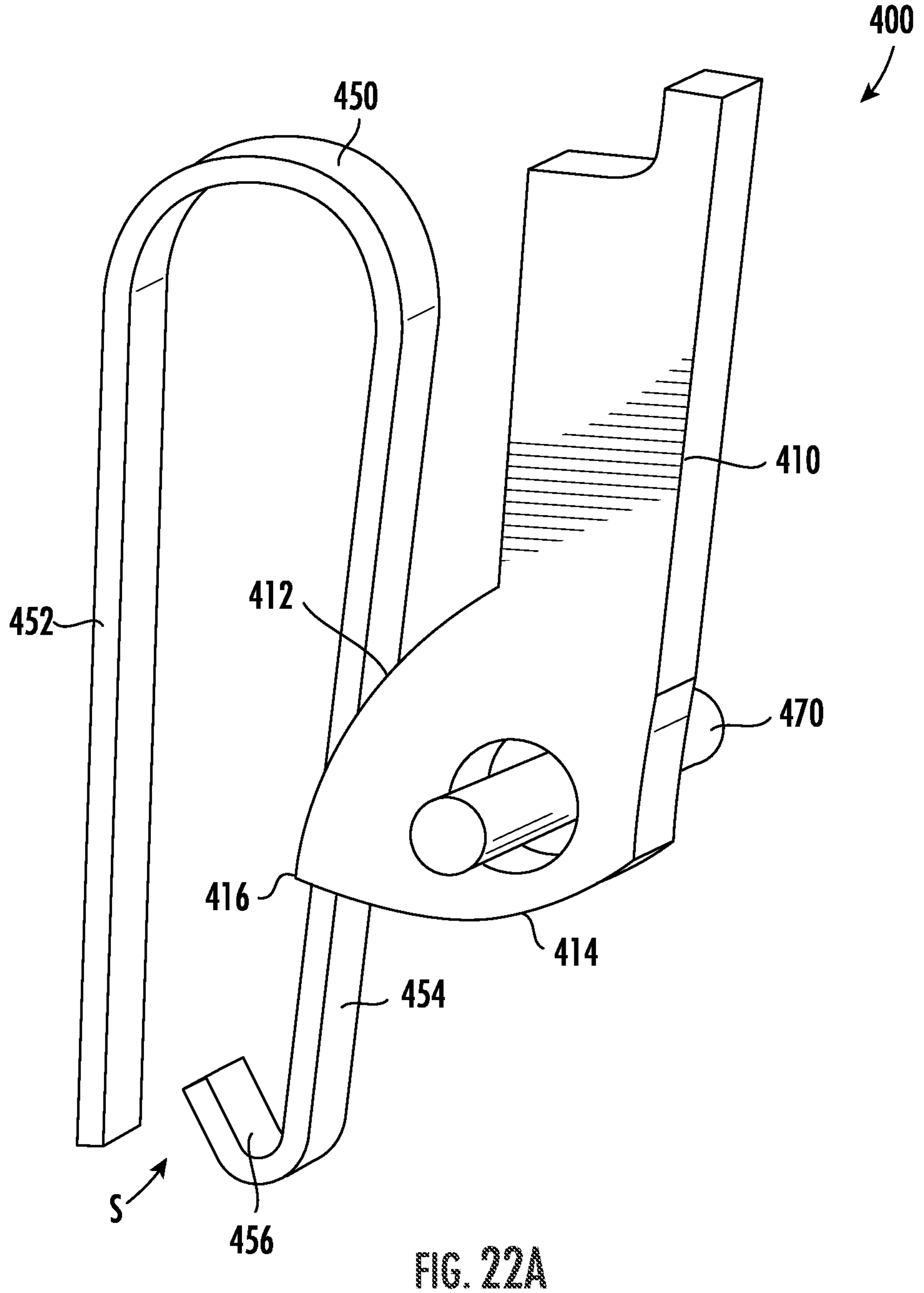
FIG. 22A illustrates a perspective view of the wire terminal of FIG. 19, the wire terminal illustrated in the first position.
Figure 22B:
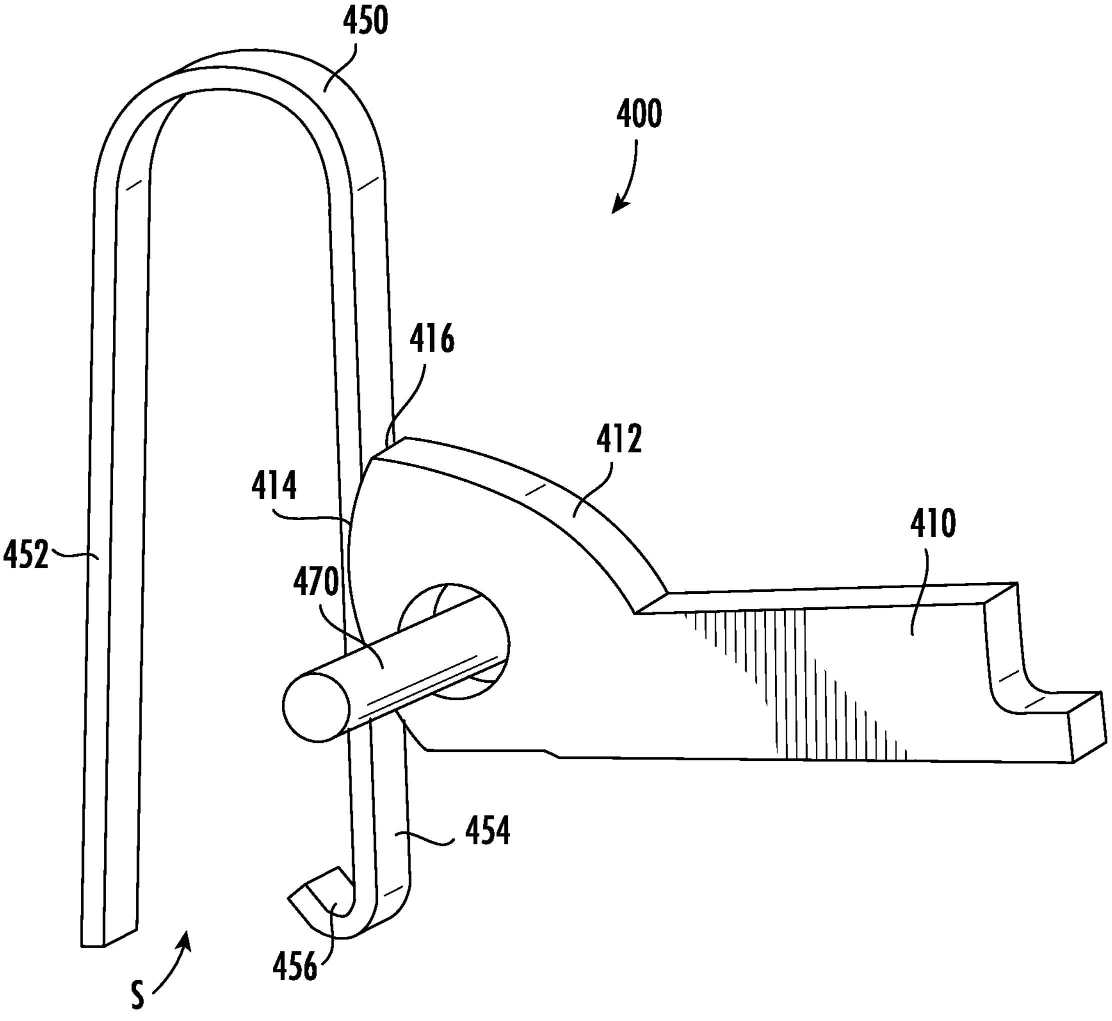
FIG. 22B illustrates a perspective view of the wire terminal of FIG. 19, the wire terminal illustrated in the second position.

In use, the lever 410 is moveable between a first position (illustratively shown in FIGS. 19, 20, and 22A) and a second position (illustratively shown in FIGS. 19, 20, and 22B). In one embodiment, as illustrated, the lever 410 may be vertically pivotable (e.g., pivot axis is parallel to a longitudinal axis of the wiring device 100). In use, as will be appreciated by one of ordinary skill in the art, the lever 410 may extend from the housing 110 of the wiring device 100 so that, during installation, a user may move the lever 410 from the first position to the second position to insert the electrical wire 125 therein. Thereafter, once the electrical wire 125 has been inserted, the user may move the lever 410 from the second position to the first position.

As will also be appreciated by one of ordinary skill in the art, while the figures may illustrate a total of four levers, different numbers of levers, springs, etc. may be used depending on the wiring device.

As best illustrated in FIG. 22B, the spring 450 may be biased to the second position. In use, the lever 450 may be moved, against its bias, from the first position to the second position. In the second position, the spring 450 is biased to open thereby creating or enlarging an electrical wire receiving space S to allow a user to install the electrical wire 125 into the wire terminal 400.

Once the wire 125 is installed, the lever 410 may be pivoted to the first position. In the first position, as best illustrated in FIG. 22A, the lever 410 compresses the spring 450 to apply a supplemental force to retain the wire 125 within the electrical wire receiving space S and to ensure that the wire 125 remains in contact with the contact 120 of the wiring device 100. That is, in the first position, the lever 410 biases or compresses the spring 450 into contact with the electrical wire 125 to maintain the electrical wire 125 within the electrical wire receiving space S (e.g., the spring 450 is arranged and configured to press against the installed electrical wire 125). Thus arranged, with the electrical wire 125 installed into the housing 110 of the wiring device 100 and the wire terminal 400, the lever 410 is moved from the second position to the first position causing the spring 450 to apply a force onto the wire 125 to bring it into contact with the internal electrical contact 120 of the wiring device 100. In addition, in one embodiment, the spring 450 may also be arranged and configured to "cut" into the electrical wire 125 to ensure contact is retained.

Figure 21:
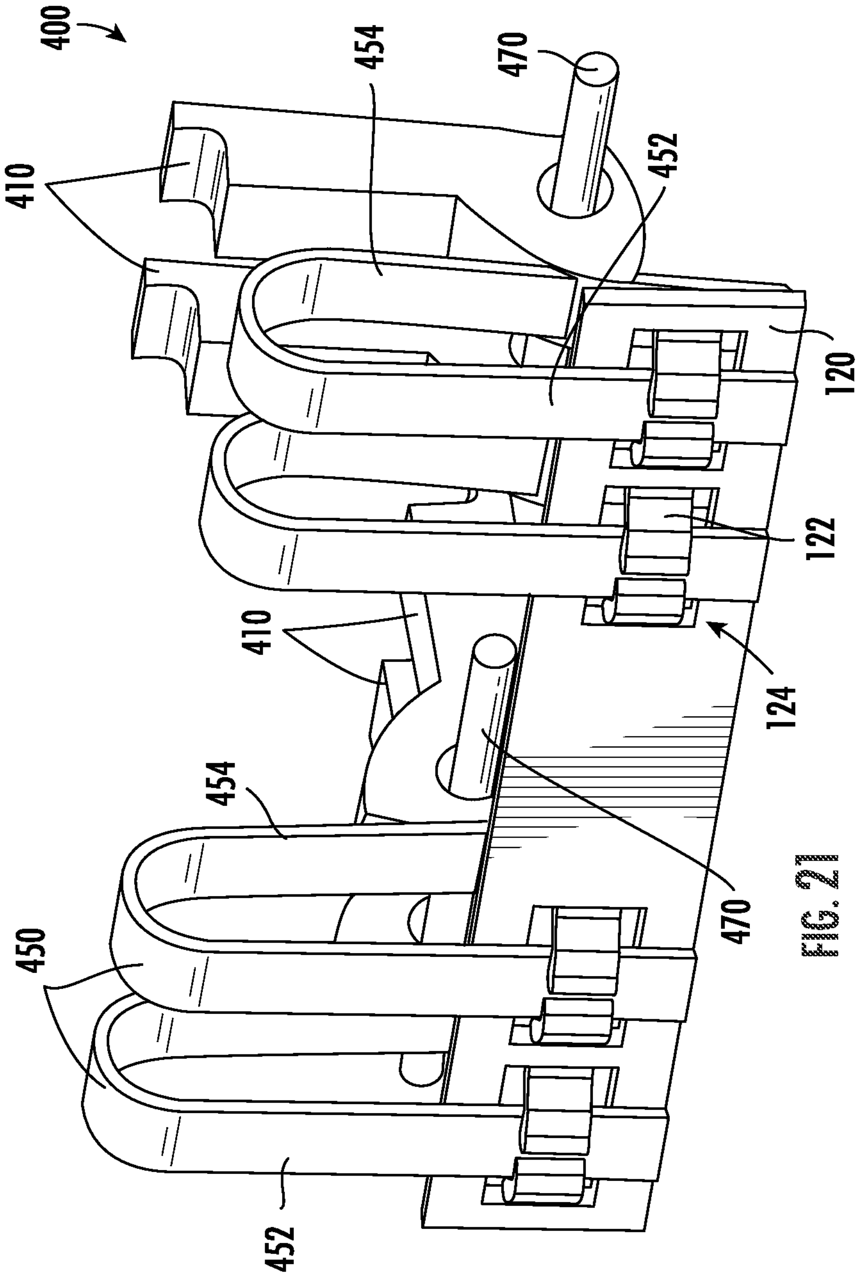
FIG. 21 illustrates a rear perspective view of the wire terminal of FIG. 19, the wire terminal illustrated in the first position and the second position.

Referring to FIG. 21, in one embodiment, the spring 450 is arranged and configured to couple, engage, etc. the electrical contact 120 of the wiring device 100. For example, as illustrated, the spring 450 may include a first arm 452 and a second arm 454. In use, the first arm 452 may be arranged and configured to contact the contact 120. For example, in one embodiment, the first arm 452 of the spring 450 may be mated directly into the contact 120 of the wiring device 100. For example, as illustrated, in one embodiment, the contact 120 may include arms 122 extending from a rear surface thereof to define a recess 124 for receiving the first arm 452 of the spring 450 therein, although it is envisioned that the spring 450 may be coupled to the contact 120 by alternative mechanisms.

As illustrated, the second arm 454 is arranged and configured to interact with the lever 410. As illustrated, the spring 450 may include a third segment 456 (FIGS. 22A and 22B) arranged and configured to contact the installed wire 125. As illustrated, in one embodiment, the third segment 456 may define a hook-shape member. As illustrated, in one embodiment, the spring 450 may be monolithically formed and may be characterized as a leaf spring. Alternatively, however, the spring 450 may be manufactured from multiple segments, which may be assembled together.

Referring to FIGS. 22A and 22B, in one embodiment, the lever 410 may include a first arcuate or cam surface 412 arranged and configured to contact the spring 450 in the first position and a second arcuate or cam surface 414 arranged and configured to contact the spring 450 in the second position. The first and second arcuate or cam surfaces 412, 414 may be angled relative to each other to thereby define a transition point 416 therebetween. Thus arranged, resistance against movement of the lever 410 may be provided. That is, in use, the transition point 416 between the first and second arcuate or cam surfaces 412, 414 provides resistance against movement (e.g., rotation, pivoting, etc.) of the lever 410 out of the first position. As such, inadvertent removal of the electrical wire 125 is prevented, or at least inhibited. For example, in use, the eccentric cam surfaces 412, 414 formed on the lever 410 cooperate so that when the lever 410 is in the second position, the user must overcome a resistive force to rotate the lever 410 to the first position. However, once the lever 410 is rotated past the transition point 416, the lever 410 is arranged and configured to snap (bias) to the first position thereby preventing or at least inhibiting inadvertent opening. That is, during movement from the second position to the first position, the first arcuate surface 412 is arranged and configured to bias the lever 410 against the second segment 454 of the spring 410 once the transition point 416 is overcome. Similarly, the transition point 416 between the first and second arcuate or cam surfaces 412, 414 provides resistance against movement (e.g., rotation, pivoting, etc.) of the lever 410 out of the second position thereby enabling easier installation.

In one embodiment, as previously mentioned, the spring 450 may also include an additional geometry, a secondary component or arm, etc. arranged and configured to engage the electrical wire 125. For example, the spring 450 may include a stab (e.g., a sharpened edge portion) extending from the spring 450, the stab arranged and configured to engage or bite into the electrical wire 125 to provide additional retention force in maintaining the wire 125 in the electrical wire receiving space S in the first position.

In use, the wire terminals are arranged and configured to enable an electrical wire 125 to be inserted and/or removed as necessary. As such, the wire terminals enable a user to remove the electrical wire and/or re-install the electrical wire as needed. For example, in connection with damaged wires and/or mis-wired devices.

Figure 23:
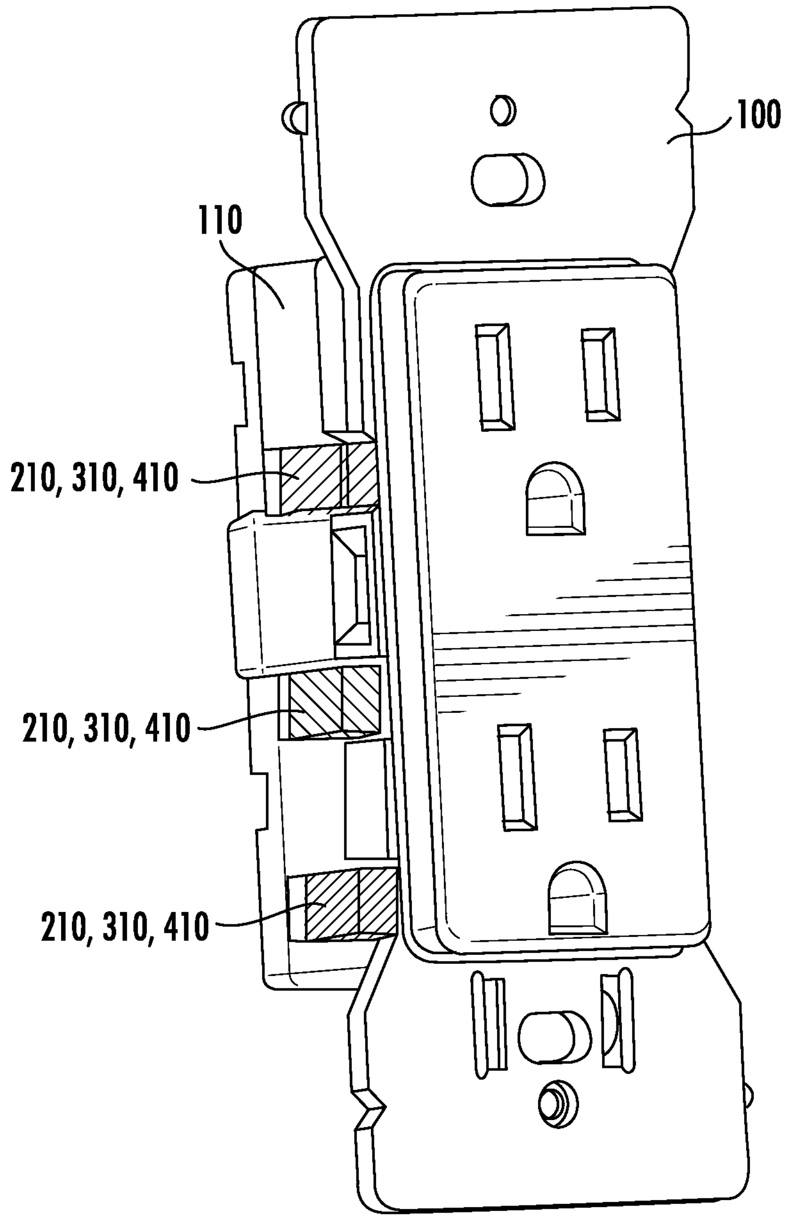
FIG. 23 illustrates a perspective view of a wire terminal in accordance with one or more features of the present disclosure.

Referring to FIG. 23, in accordance with one or more features of the present disclosure, the lever or lever arms 210, 310, 410 may be color coded to assist the user with installation of the electrical wires 125. For example, in one embodiment, the first lever 210, 310, 410 arranged and configured for a ground connection may be a first color such as, for example, green, the second lever 210, 310, 410 arranged and configured for a neutral connection may be a second color such as, for example, white, a third lever 210,

310, 410 arranged and configured for a common or phase connection may be a third color such as, for example, black, and a fourth lever arranged and configured to a traveler wire connection may be a fourth color such as, for example, red.

Figure 24:
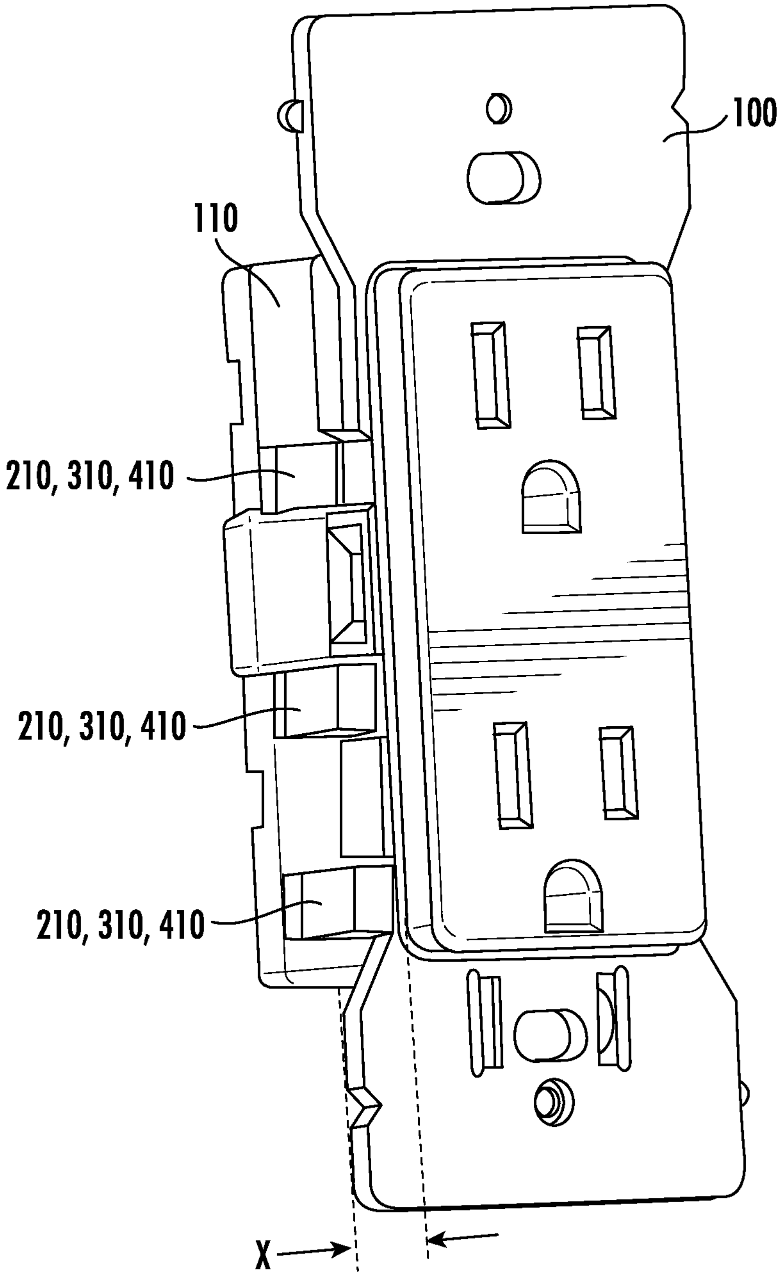
FIG. 24 illustrates a perspective view of a wire terminal in accordance with one or more features of the present disclosure.

Referring to FIG. 24, in accordance with one or more features of the present disclosure, the lever or lever arms 210, 310, 410 may be arranged and configured so that a proximal end of the levers 210, 310, 410 (e.g., portion of the levers 210, 310, 410 opposite the pivot and which is arranged and configured to be grabbed by the user) resides in close proximity to the body 110 of the wiring device 100 when the levers 210, 310, 410 are in the first position. Thus arranged, during removal of the wiring device 100 from the electrical box, the levers 210, 310, 410 are arranged and configured to prevent snagging with any electrical wires located in the electrical box thereby preventing, or at least reducing the likelihood, that the levers 210, 310, 410 can be inadvertently or accidentally moved from the first position to the second position during removal of the wiring device 100 from the electrical box. That is, by configuring the levers 210, 310, 410 so that they reside in close proximity to the wiring device 100 in the first position, interference between the levers 210, 310, 410 and any electrical wires in the electrical box is minimized thereby preventing, or at least greatly inhibiting, a wire within the electrical box from inadvertently snagging the lever 210, 310, 410 thereby moving the lever 210, 310, 410 from the first position to the second position resulting in a loss of electrical continuity (opening the lever connection).

Additionally, and/or alternatively, referring to FIG. 24, in accordance with one or more features of the present disclosure, the lever or lever arms 210, 310, 410 may be arranged and configured so that a proximal end of the levers 210, 310, 410 (e.g., portion of the levers 210, 310, 410 opposite the pivot and which is arranged and configured to be grabbed by the user) resides within a specified distance X from the wiring device. For example, in one embodiment, the proximal end of the levers 210, 310, 410 may be arranged and configured to reside within the outer circumference defined by the strap of the wiring device 100 when the levers 210, 310, 410 are in the first position. In one example embodiment, in use, the proximal end of the levers 210, 310, 410 (e.g., portion of the levers 210, 310, 410 opposite the pivot and which is arranged and configured to be grabbed by the user) may be arranged and configured to reside within a zone wherein electrical wires within the electrical box would unlikely reside. For example, in one embodiment, the proximal end of the levers 210, 310, 410 may be arranged and configured to extend in a zone extending between approximately 0.10 inches forward or past the strap as measured from the backside of the strap to approximately 0.25 inches extending rearwards (e.g., into the electrical box) from the backside of the strap (e.g., the backside of the strap being the surface of the strap in contact with the wall or electrical box). Thus arranged, interference between the levers 210, 310, 410 and any electrical wires in the electrical box is further minimized thereby preventing, or at least greatly inhibiting, a wire within the electrical box from inadvertently snagging the lever 210, 310, 410 thereby moving the lever 210, 310, 410 from the first position to the second position resulting in a loss of electrical continuity (opening the lever connection).

Additionally, and/or alternatively, in accordance with one or more features of the present disclosure and as previously mentioned, the electrical wiring device can be any suitable wiring device now known or hereafter developed. For example, the wiring device can be duplex, decorator style, etc. Moreover, in use, regardless whether the lever or lever arms 210, 310, 410 are arranged and configured to pivot either vertical about a horizontal pivot or horizontally about a vertical pivot, the proximal end of the levers 210, 310, 410 (e.g., portion of the levers 210, 310, 410 opposite the pivot and which is arranged and configured to be grabbed by the user) are preferably arranged and configured so that when the levers 210, 310, 410 are positioned in the first (e.g., closed) position, the levers 210, 310, 410 do not extend laterally beyond a perimeter of the device face. Thus arranged, the distance between the levers 210, 310, 410 and the side of the electrical box is maximized.

The foregoing description has broad application. While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments. Rather these embodiments should be considered as illustrative and not restrictive in character. All changes and modifications that come within the spirit of the invention are to be considered within the scope of the disclosure. The present disclosure should be given the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art. Unless otherwise defined, all technical terms used herein have the same meaning as commonly understood by one of ordinary skill in the art to which the disclosure belongs.

Directional terms such as top, bottom, superior, inferior, medial, lateral, anterior, posterior, proximal, distal, upper, lower, upward, downward, left, right, longitudinal, front, back, above, below, vertical, horizontal, radial, axial, clockwise, and counterclockwise) and the like may have been used herein. Such directional references are only used for identification purposes to aid the reader's understanding of the present disclosure. For example, the term "distal" may refer to the end farthest away from the medical professional/operator when introducing a device into a patient, while the term "proximal" may refer to the end closest to the medical professional when introducing a device into a patient. Such directional references do not necessarily create limitations, particularly as to the position, orientation, or use of this disclosure. As such, directional references should not be limited to specific coordinate orientations, distances, or sizes, but are used to describe relative positions referencing particular embodiments. Such terms are not generally limiting to the scope of the claims made herein. Any embodiment or feature of any section, portion, or any other component shown or particularly described in relation to various embodiments of similar sections, portions, or components herein may be interchangeably applied to any other similar embodiment or feature shown or described herein.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. Furthermore, references to "one embodiment" of the present disclosure are not intended to be interpreted as excluding the existence of additional embodiments that also incorporate the recited features.

In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As used herein, an element or step recited in the singular and proceeded with the word "a" or "an" should be understood as not excluding plural elements or steps, unless such exclusion is explicitly recited. It will be further understood that the terms "comprises" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

The phrases "at least one", "one or more", and "and/or", as used herein, are open-ended expressions that are both conjunctive and disjunctive in operation. The terms "a" (or "an"), "one or more" and "at least one" can be used interchangeably herein.

Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments or configurations. Moreover, the following claims are hereby incorporated into this Detailed Description by this reference, with each claim standing on its own as a separate embodiment of the present disclosure.

What is claimed is:

1. A wiring device, comprising:

a housing; and a wire terminal arranged and configured to be mechanically and electrically secured to a line-voltage AC electrical wire, the wire terminal including:

a lever arranged and configured to rotate between a first position and a second position, the rotation being about a first axis;

an electrical wire receiving space defined at least partially by at least one of a cage portion or a spring portion;

wherein, in the second position, the lever moves at least one of the cage portion or the spring portion to enlarge the electrical wire receiving space to receive the electrical wire along a second axis, and, in the first position, the lever moves at least one of the cage portion or the spring portion to reduce the electrical wire receiving space, wherein the reduction of electrical wire receiving space causes at least one of the cage portion or the spring portion to engage the electrical wire to securely retain the electrical wire within the electrical wire receiving space;

wherein at least one of the cage portion or the spring portion are biased towards reducing the electrical wire receiving space; and wherein the first axis and the second axis are parallel.

2. The wiring device of claim 1, wherein the cage portion at least partially defines the electrical wire receiving space, the spring portion is at least partially positioned within the electrical wire receiving space defined by the cage portion.

3. The wiring device of claim 1, wherein the cage portion and the spring portion are parts of a monolithic structure.

4. The wiring device of claim 1, wherein cage portion and spring portion are separable from one another.

5. The wiring device of claim 1, further comprising a contact portion adjacent to the electrical wire receiving space, wherein the contact cooperates with at least one of the cage portion or the spring portion to securely retain the electrical wire within the electrical wire receiving space when the lever is in the first position.

6. The wiring device of claim 5, wherein the cage portion is movable relative to the contact portion.

7. The wiring device of claim 5, wherein the cage portion may joggle relative to the contact portion.

8. The wiring device of claim 5, wherein the cage portion includes a first arm, a second arm, and a sidewall extending therebetween, the first and second arms each including an opening arranged and configured to enable the contact portion to pass at least partially therethrough, the first and second arms and the sidewall at least partially defining the electrical wire receiving space.

9. The wiring device of claim 1, further comprising a second lever and a third lever, each of the lever, the second lever, and the third lever being color-coded to indicate ground, neutral, and phase connection.

10. The wiring device of claim 1, wherein the lever includes a body portion and a lever arm extending from the body portion, the body portion includes a first cam arranged and configured to contact the cage portion when in the first position and a second cam arranged and configured to contact the spring portion in the second position.

11. The wiring device of claim 10, wherein the body portion comprises a cylinder, the second cam being larger than the first cam so that the second cam extends from an outer surface of the body portion by a distance greater than a distance of the first cam.

12. The wiring device of claim 10, wherein the first and second cams are rotationally offset relative to each other by ninety-degrees.

13. The wiring device of claim 10, wherein the spring portion includes a first segment, a second segment extending from an end of the first segment, and a third segment extending from an end of the second segment, the third segment being arranged and configured to engage the cage portion.

14. The wiring device of claim 13, wherein:

in the second position, the second cam formed on the body portion of the lever contacts an inner surface of the spring portion to move the spring portion away from an electrical contact; and in the first position, the first cam formed on the body portion of the lever contacts the cage portion to move the cage portion and the spring portion towards the electrical contact to apply a supplemental force to retain the electrical wire within the electrical wire receiving space.

15. A wiring device, comprising:

a housing;

an electrical contact disposed at least partially within the housing; and a wire terminal arranged and configured to be mechanically and electrically secured to a line-voltage AC electrical wire, the wire terminal including:

a lever arranged and configured to rotate between a first position and a second position, the rotation being about a first axis;

an electrical wire receiving space defined at least partially by at least one of a cage portion or a spring portion;

wherein, in the second position, the lever moves at least one of the cage portion or the spring portion to enlarge the electrical wire receiving space to receive the electrical wire along a second axis, and, in the first position, the lever moves at least one of the cage portion or the spring portion to reduce the electrical wire receiving space, wherein the reduction of electrical wire receiving space causes at least one of the cage portion or the spring portion to engage the electrical wire to securely retain the electrical wire within the electrical wire receiving space;

wherein at least one of the cage portion or the spring portion are biased towards reducing the electrical wire receiving space; and wherein the first axis and the second axis are parallel.

16. The wiring device of claim 15, wherein the cage portion and the spring portion are parts of a monolithic structure.

17. The wiring device of claim 15, wherein cage portion and spring portion are separable from one another.

18. The wiring device of claim 15, wherein the cage portion is movable relative to the electrical contact.

19. The wiring device of claim 15, wherein the cage portion may joggle relative to the electrical contact.

20. The wiring device of claim 15, wherein the lever includes a body portion and a lever arm extending from the body portion, the body portion includes a first cam arranged and configured to contact the cage portion when in the first position and a second cam arranged and configured to contact the spring portion in the second position.

21. The wiring device of claim 15, wherein the cage portion includes a first arm, a second arm, and a sidewall extending therebetween, the first and second arms each including an opening arranged and configured to enable the contact portion to pass at least partially therethrough, the first and second arms and the sidewall at least partially defining the electrical wire receiving space.

22. A wiring device, comprising:

a housing; and a wire terminal arranged and configured to be mechanically and electrically secured to a line-voltage AC electrical wire, the wire terminal including:

a lever arranged and configured to rotate between a first position and a second position, the rotation being about a first axis;

an electrical wire receiving space defined at least partially by at least one of a cage portion or a spring portion;

wherein, in the second position, the lever moves at least one of the cage portion or the spring portion to enlarge the electrical wire receiving space to receive the electrical wire along a second axis, and, in the first position, the lever moves at least one of the cage portion or the spring portion to reduce the electrical wire receiving space, wherein the reduction of electrical wire receiving space causes at least one of the cage portion or the spring portion to engage the electrical wire to securely retain the electrical wire within the electrical wire receiving space;

wherein at least one of the cage portion or the spring portion are biased towards reducing the electrical wire receiving space; and wherein the lever includes a body portion and a lever arm extending from the body portion, the body portion includes a first cam arranged and configured to contact the cage portion when in the first position and a second cam arranged and configured to contact the spring portion in the second position.

23. The wiring device of claim 22, wherein the body portion comprises a cylinder, the second cam being larger than the first cam so that the second cam extends from an outer surface of the body portion by a distance greater than a distance of the first cam.

24. The wiring device of claim 22, wherein the first and second cams are rotationally offset relative to each other by ninety-degrees.

25. The wiring device of claim 22, wherein the spring portion includes a first segment, a second segment extending from an end of the first segment, and a third segment extending from an end of the second segment, the third segment being arranged and configured to engage the cage portion.

26. The wiring device of claim 25, wherein:

in the second position, the second cam formed on the body portion of the lever contacts an inner surface of the spring portion to move the spring portion away from an electrical contact; and in the first position, the first cam formed on the body portion of the lever contacts the cage portion to move the cage portion and the spring portion towards the electrical contact to apply a supplemental force to retain the electrical wire within the electrical wire receiving space.

27. The wiring device of claim 22, wherein the first axis and the second axis are parallel.

28. A wiring device, comprising:

a housing; and a wire terminal arranged and configured to be mechanically and electrically secured to a line-voltage AC electrical wire, the wire terminal including:

a lever arranged and configured to rotate between a first position and a second position, the rotation being about a first axis;

an electrical wire receiving space defined at least partially by at least one of a cage portion or a spring portion;

a contact adjacent to the electrical wire receiving space, wherein the contact cooperates with at least one of the cage portion or the spring portion to securely retain the electrical wire within the electrical wire receiving space when the lever is in the first position;

wherein, in the second position, the lever moves at least one of the cage portion or the spring portion to enlarge the electrical wire receiving space to receive the electrical wire along a second axis, and, in the first position, the lever moves at least one of the cage portion or the spring portion to reduce the electrical wire receiving space, wherein the reduction of electrical wire receiving space causes at least one of the cage portion or the spring portion to engage the electrical wire to securely retain the electrical wire within the electrical wire receiving space;

wherein at least one of the cage portion or the spring portion are biased towards reducing the electrical wire receiving space; and wherein the cage portion may joggle relative to the contact portion.

29. The wiring device of claim 28, wherein the first axis and the second axis are parallel.

30. A wiring device, comprising:

a housing; and a wire terminal arranged and configured to be mechanically and electrically secured to a line-voltage AC electrical wire, the wire terminal including:

a lever arranged and configured to rotate between a first position and a second position, the rotation being about a first axis;

an electrical wire receiving space defined at least partially by at least one of a cage portion or a spring portion;

a contact adjacent to the electrical wire receiving space, wherein the contact cooperates with at least one of the cage portion or the spring portion to securely retain the electrical wire within the electrical wire receiving space when the lever is in the first position;

wherein, in the second position, the lever moves at least one of the cage portion or the spring portion to enlarge the electrical wire receiving space to receive the electrical wire along a second axis, and, in the first position, the lever moves at least one of the cage portion or the spring portion to reduce the electrical wire receiving space, wherein the reduction of electrical wire receiving space causes at least one of the cage portion or the spring portion to engage the electrical wire to securely retain the electrical wire within the electrical wire receiving space;

wherein at least one of the cage portion or the spring portion are biased towards reducing the electrical wire receiving space; and wherein the cage portion includes a first arm, a second arm, and a sidewall extending therebetween, the first and second arms each including an opening arranged and configured to enable the contact portion to pass at least partially therethrough, the first and second arms and the sidewall at least partially defining the electrical wire receiving space.

31. The wiring device of claim 30, wherein the first axis and the second axis are parallel.

* * * * *